United States Patent [19]

Raybon

[11] 4,092,782
[45] June 6, 1978

[54] APPARATUS FOR SIMULATING INTERSECTING STRUCTURAL ELEMENTS

[75] Inventor: Charles L. Raybon, Phoenix, Ariz.

[73] Assignee: Time Saver Industries, Inc., Phoenix, Ariz.

[21] Appl. No.: 730,030

[22] Filed: Oct. 6, 1976

[51] Int. Cl.² ............................................. G01B 3/00
[52] U.S. Cl. .................................. 33/174 N; 33/21 C
[58] Field of Search .................... 33/21 C, 174 N, 175

[56] References Cited

U.S. PATENT DOCUMENTS

| | | | |
|---|---|---|---|
| 2,380,919 | 8/1945 | Bugenhagen | 33/174 N |
| 2,563,559 | 8/1951 | Gardner | 33/174 N |
| 2,852,847 | 9/1958 | Cast | 33/21 C |

Primary Examiner—Harry N. Haroian
Attorney, Agent, or Firm—Herbert E. Haynes, Jr.

[57] ABSTRACT

An apparatus for simulating the surfaces and the attitudes of intersecting structural elements for determining the configuration of the elements at the intersection thereof.

50 Claims, 41 Drawing Figures

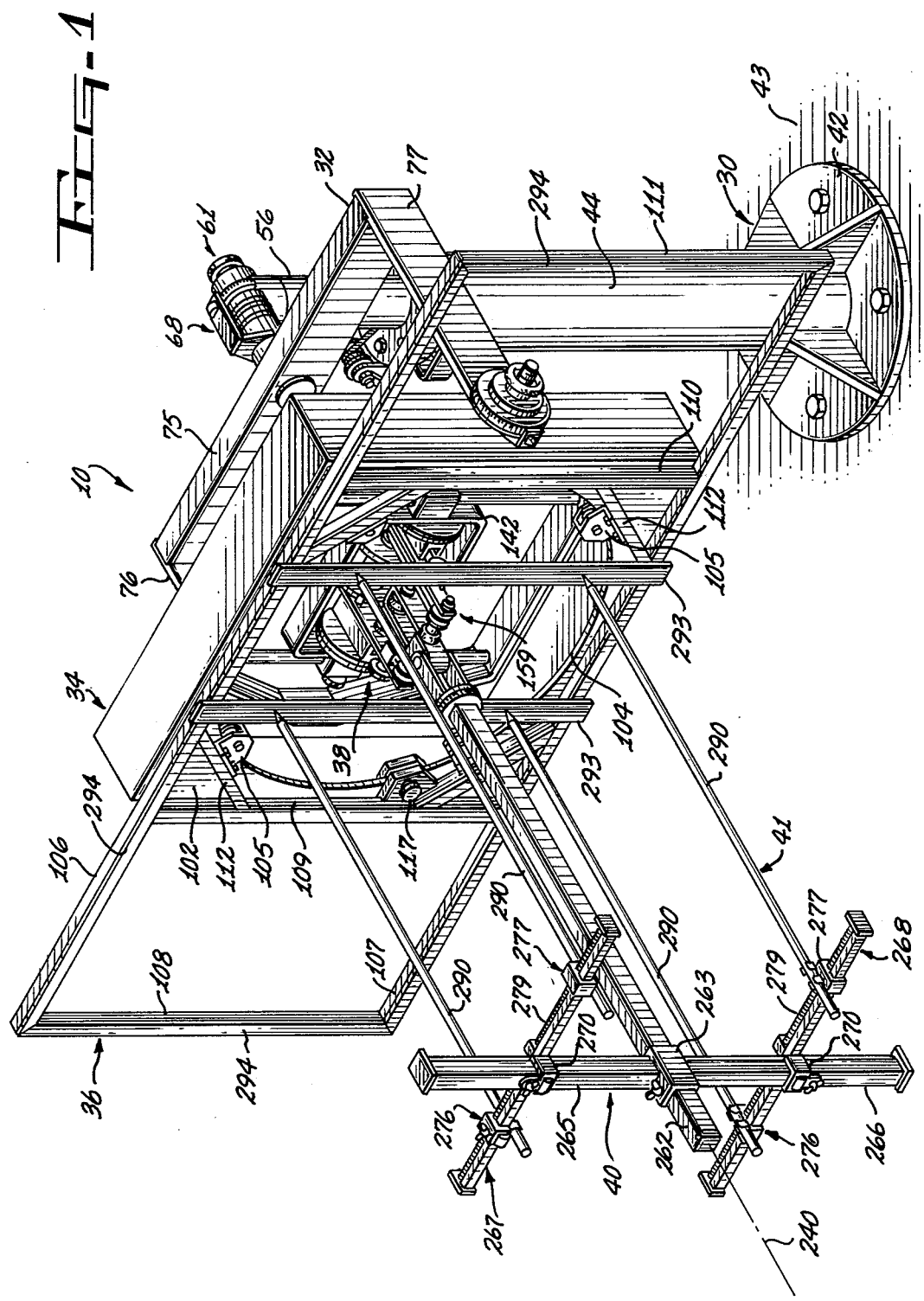

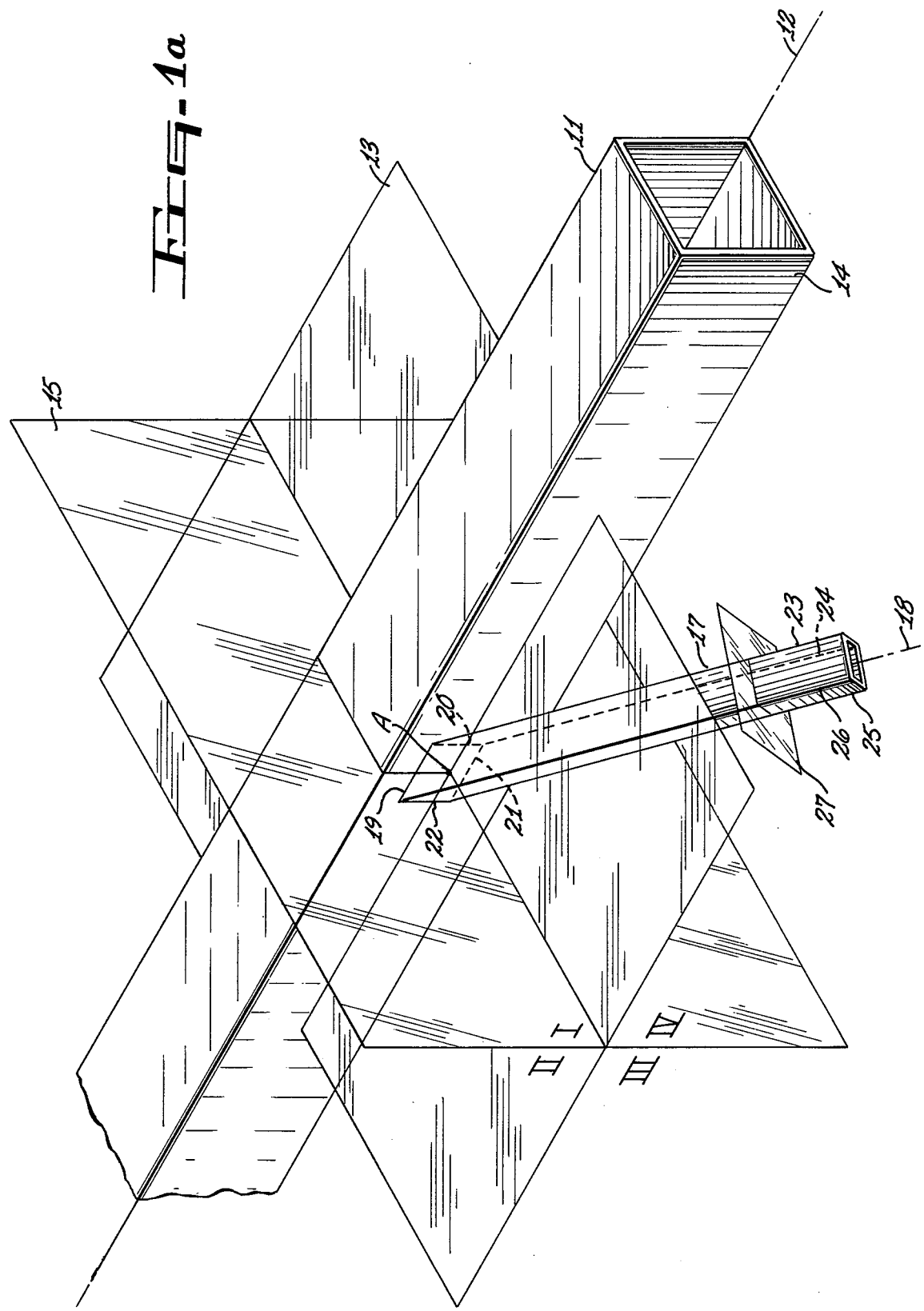

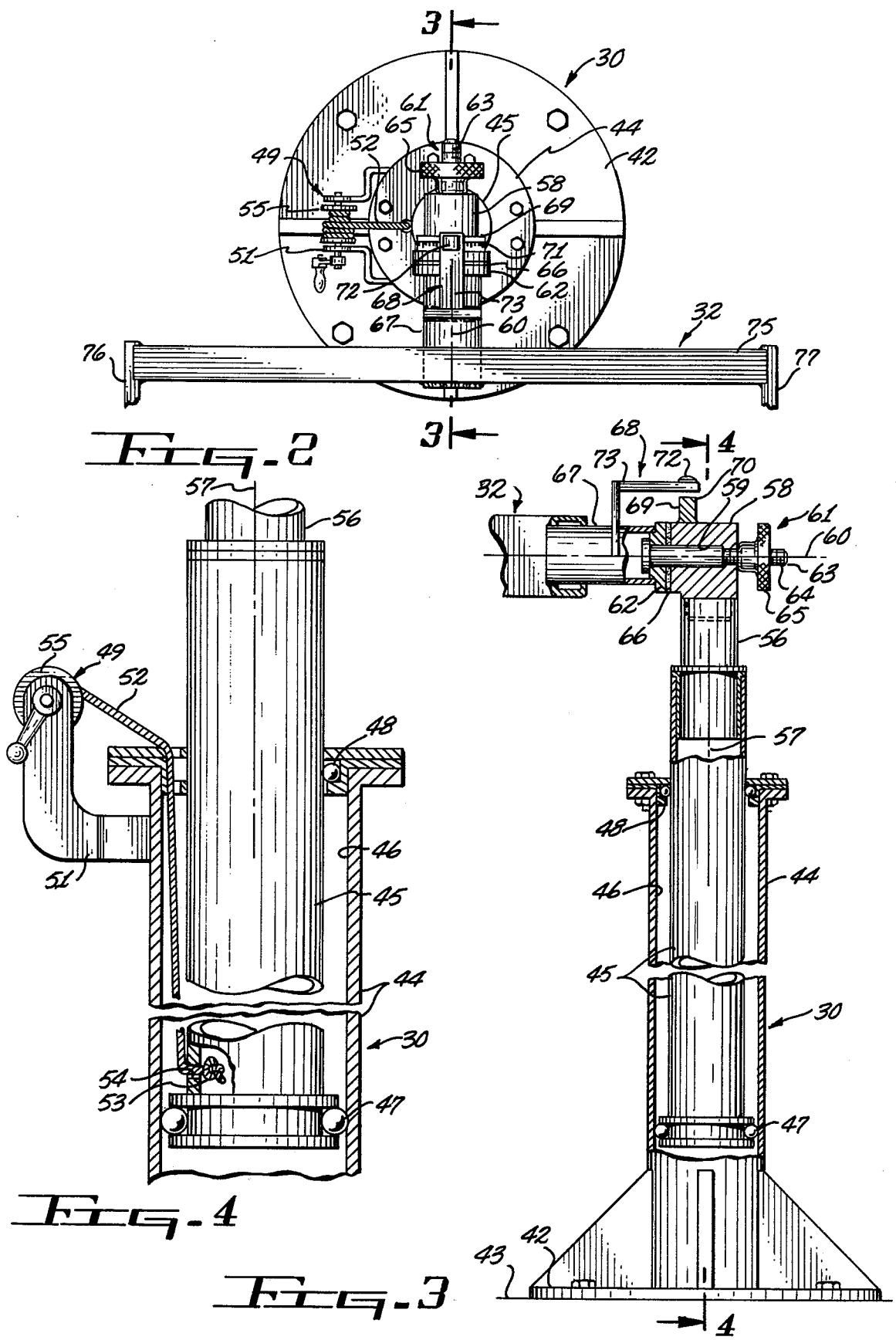

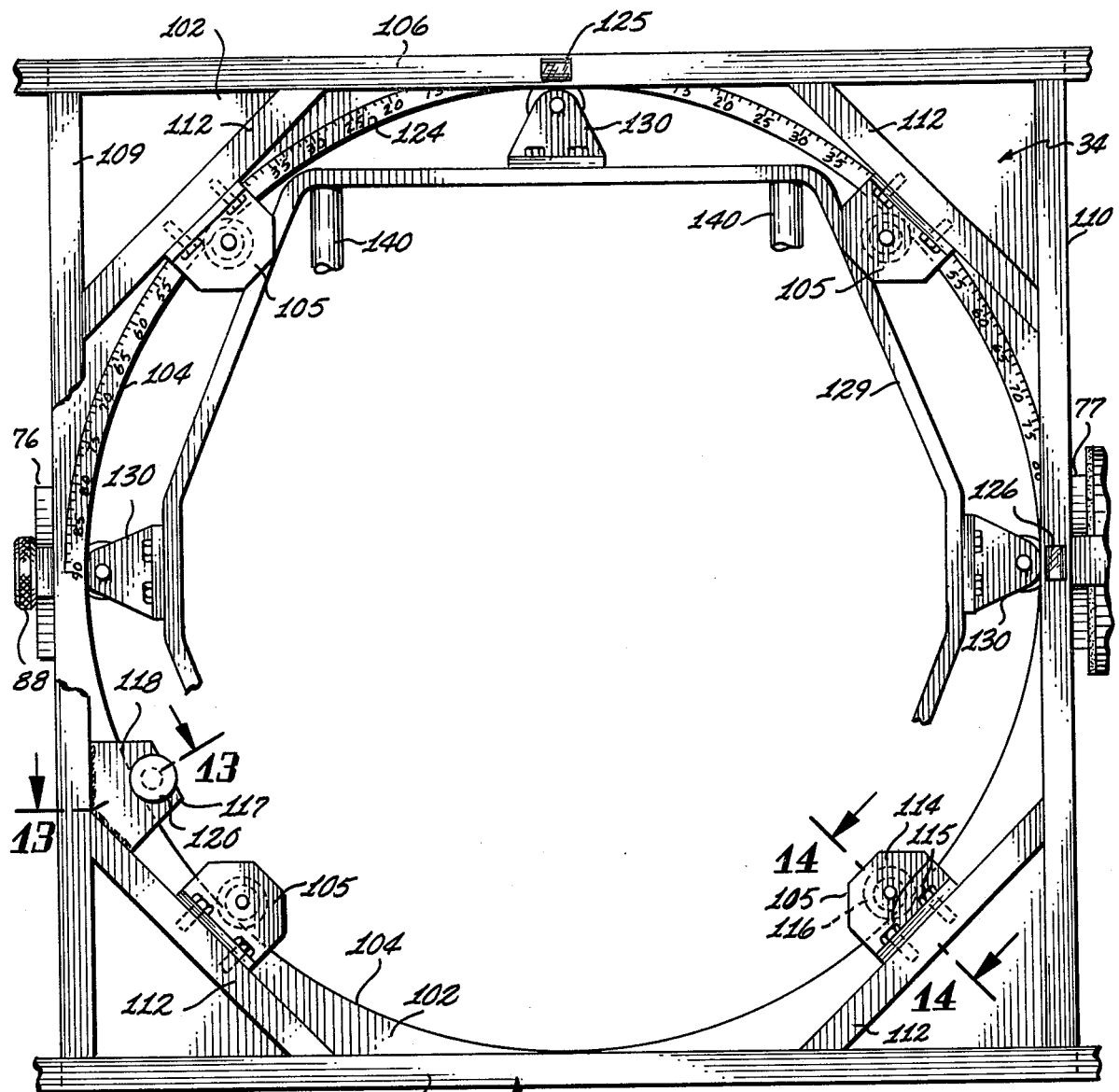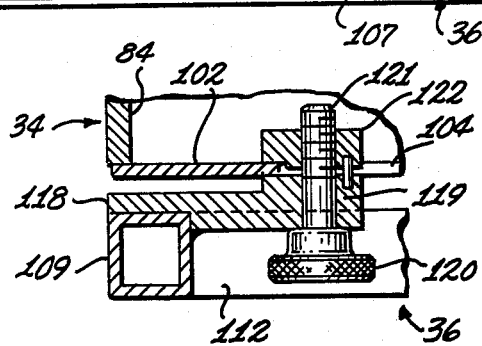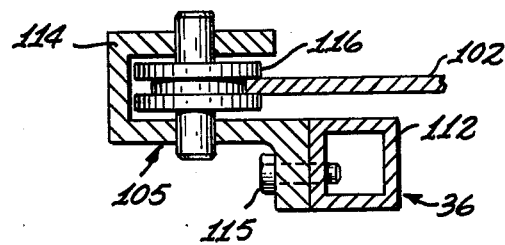

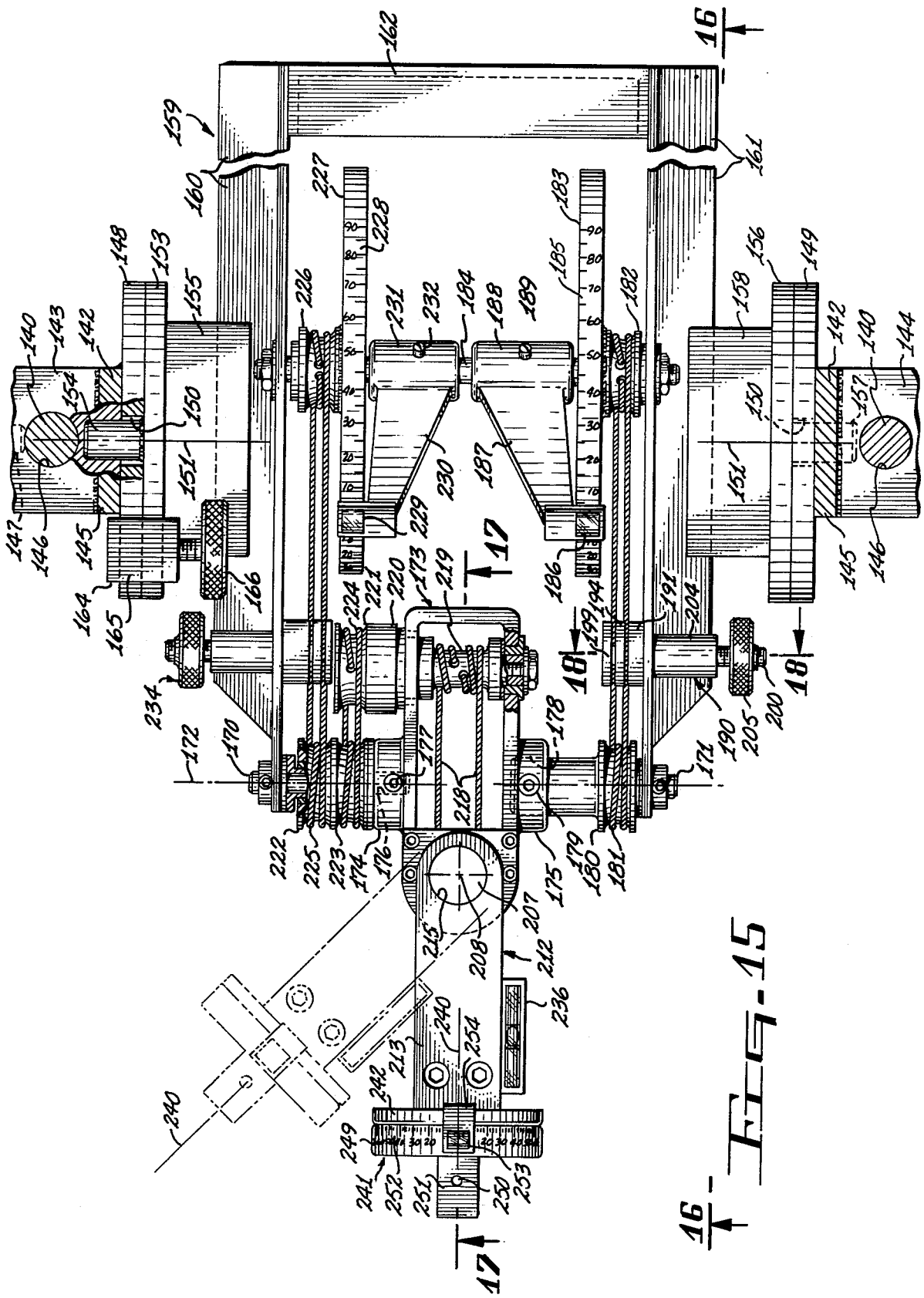

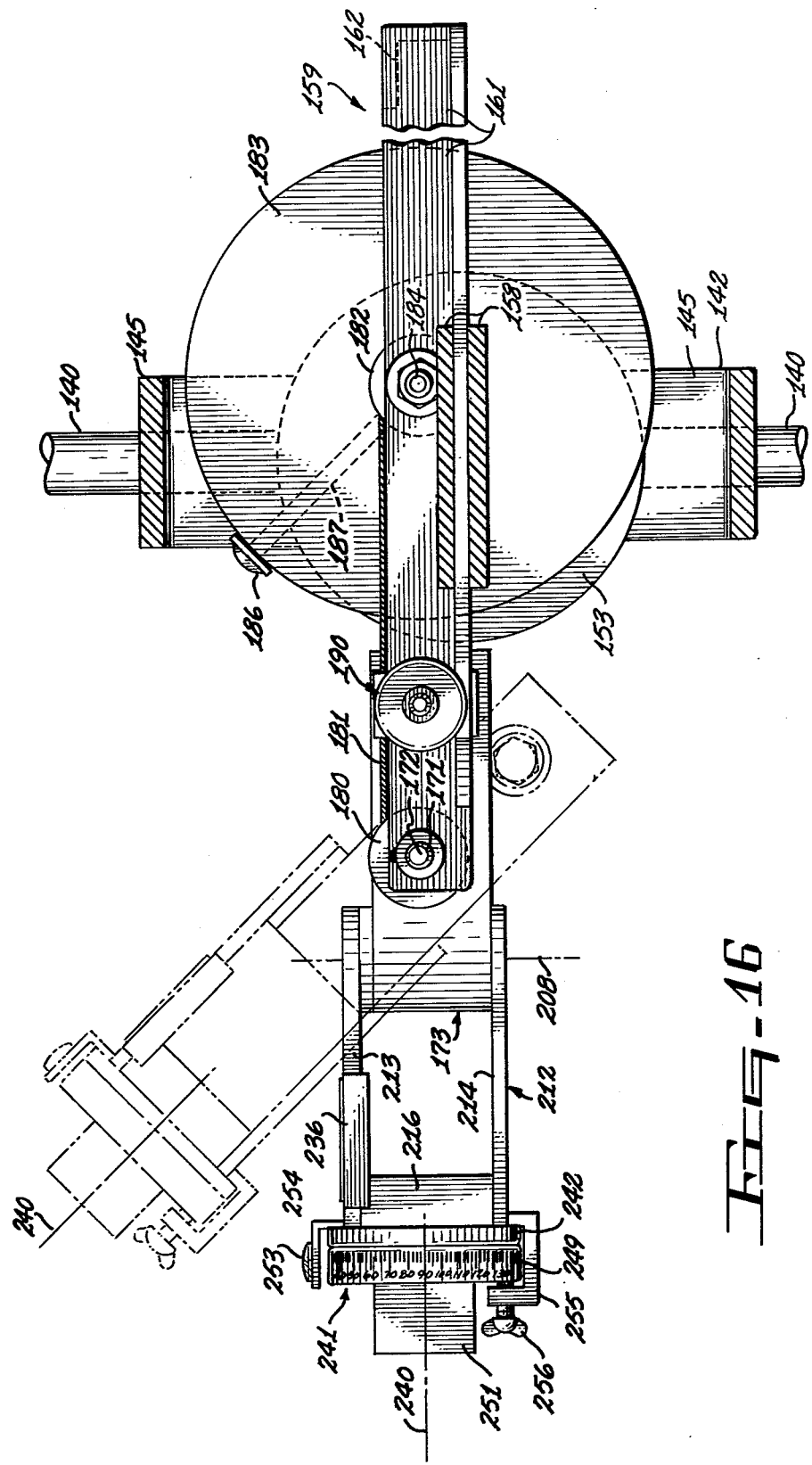

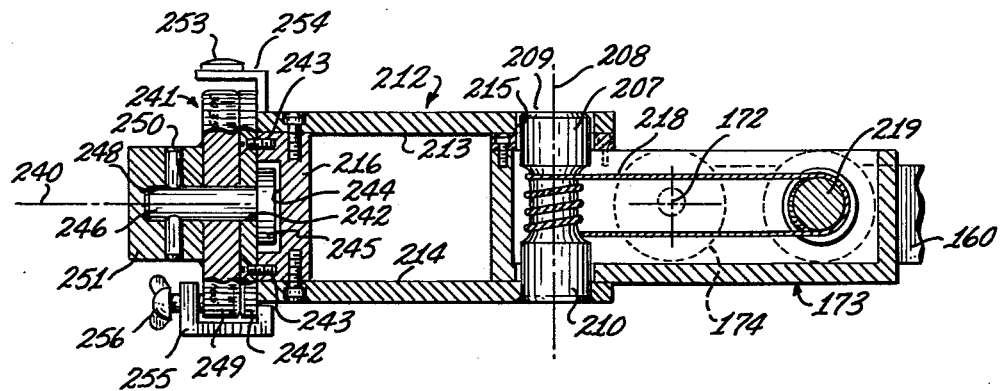
_Fig_-17
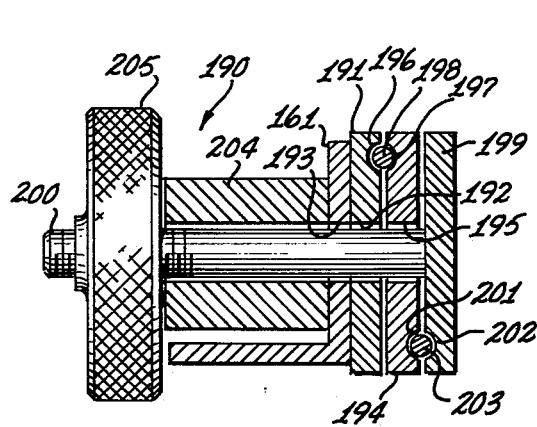
_Fig_-18
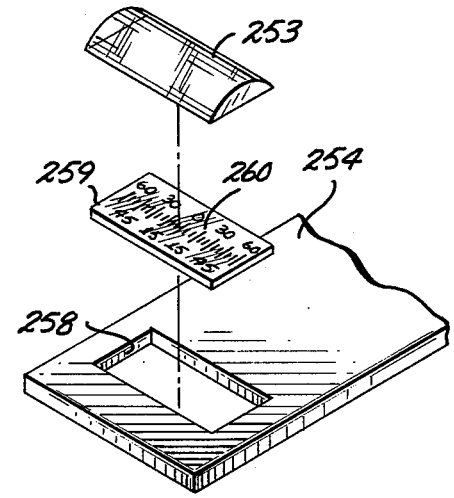
_Fig_-19

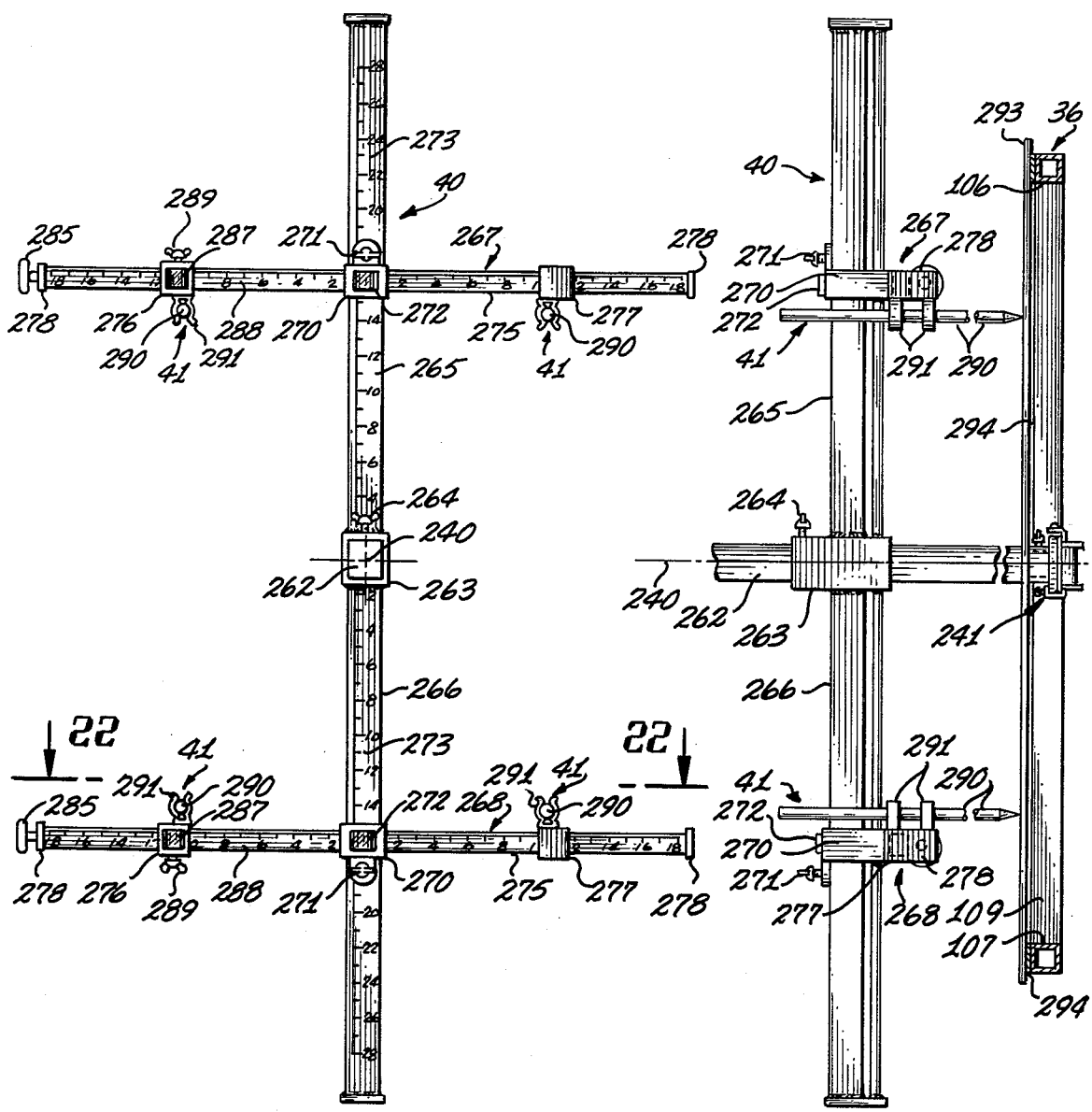
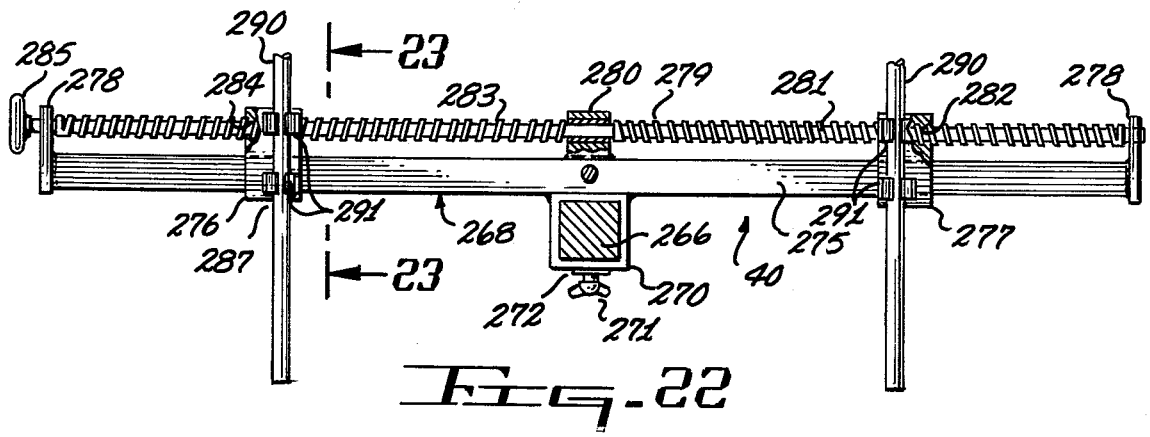

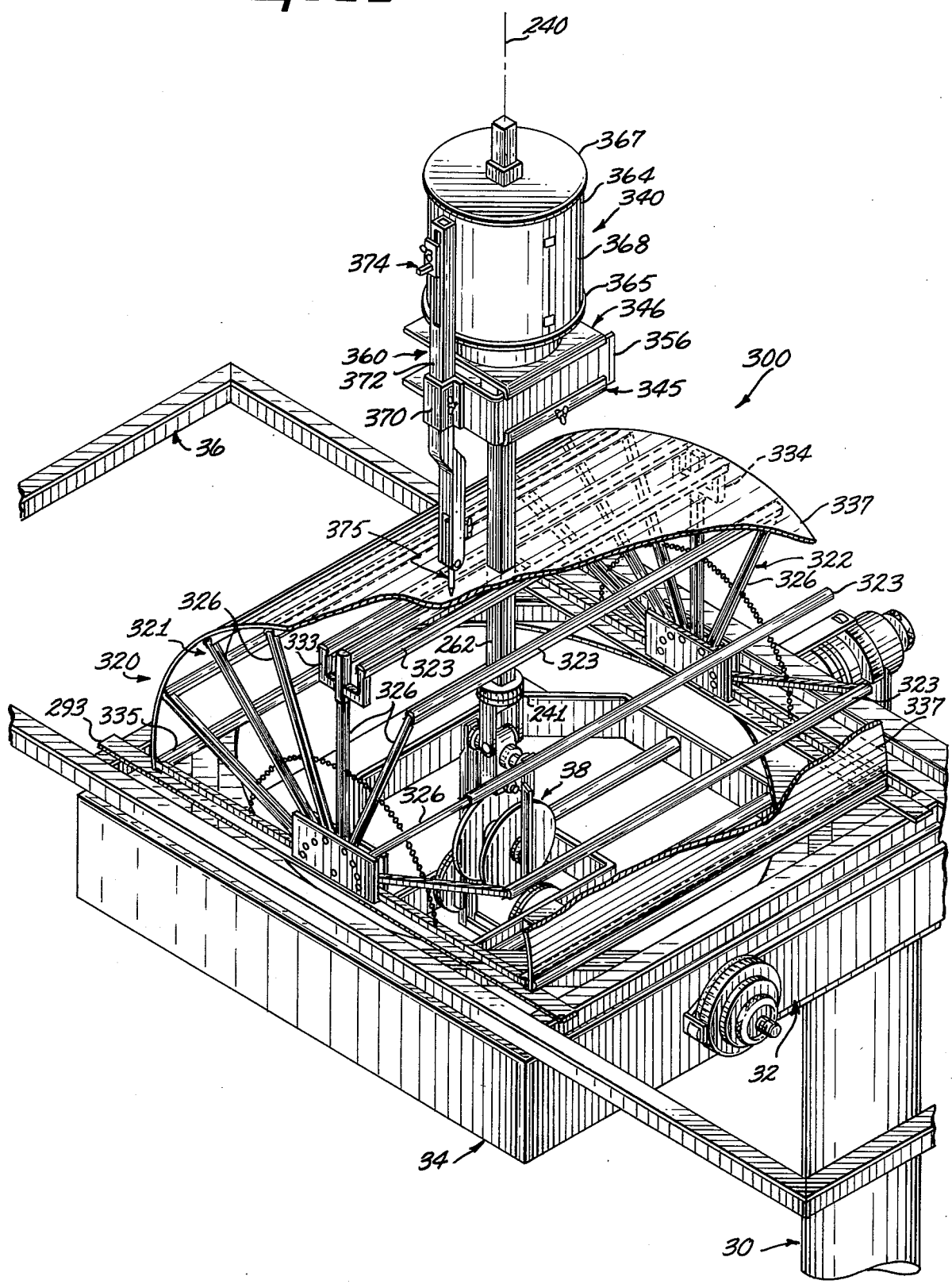

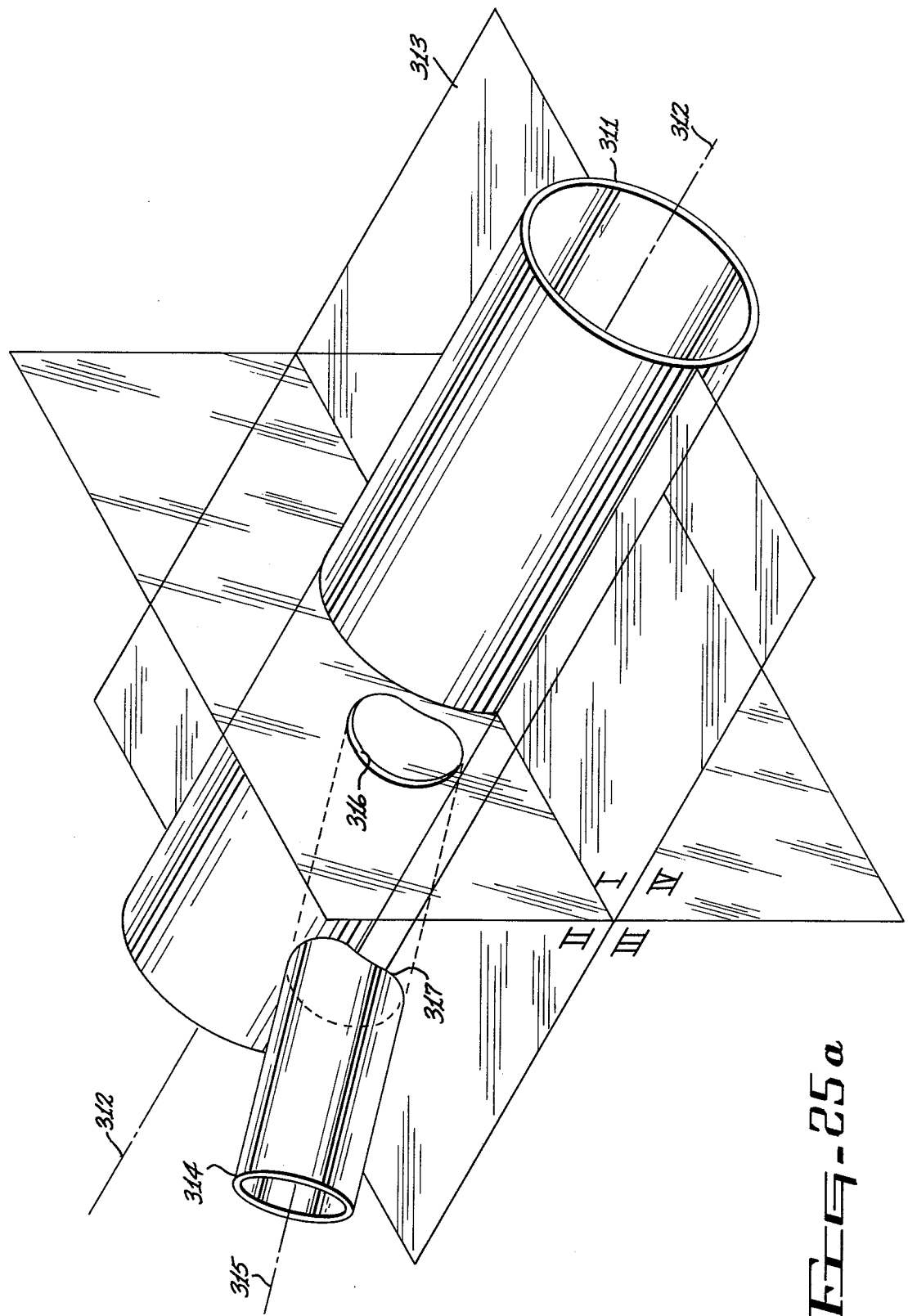

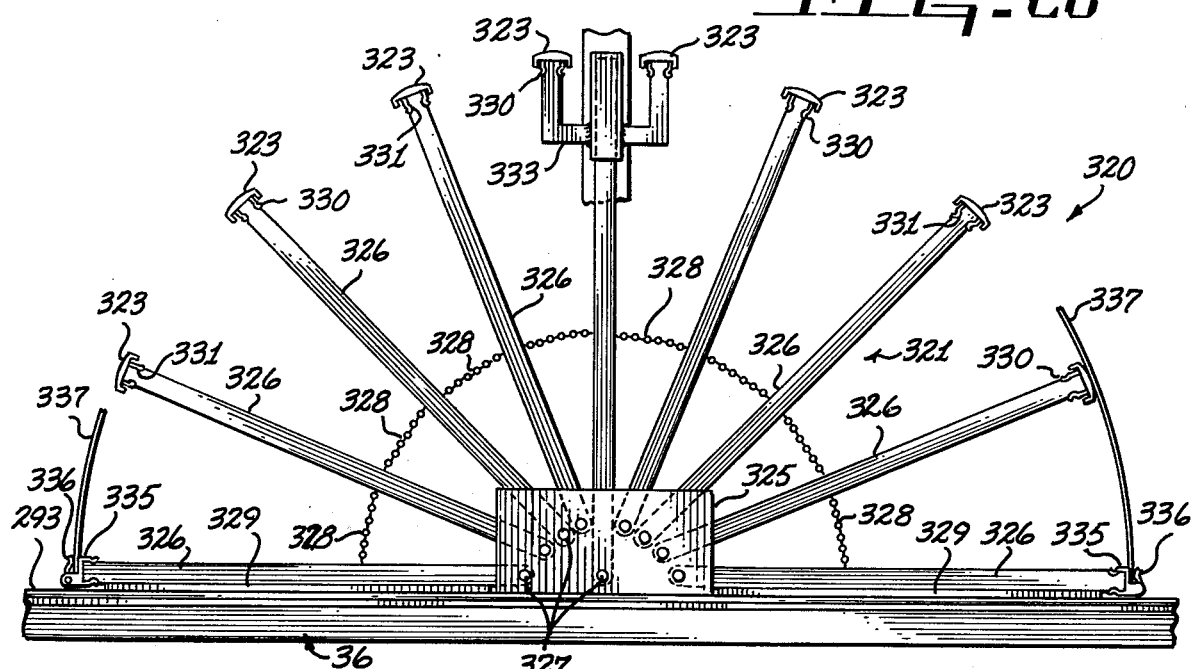
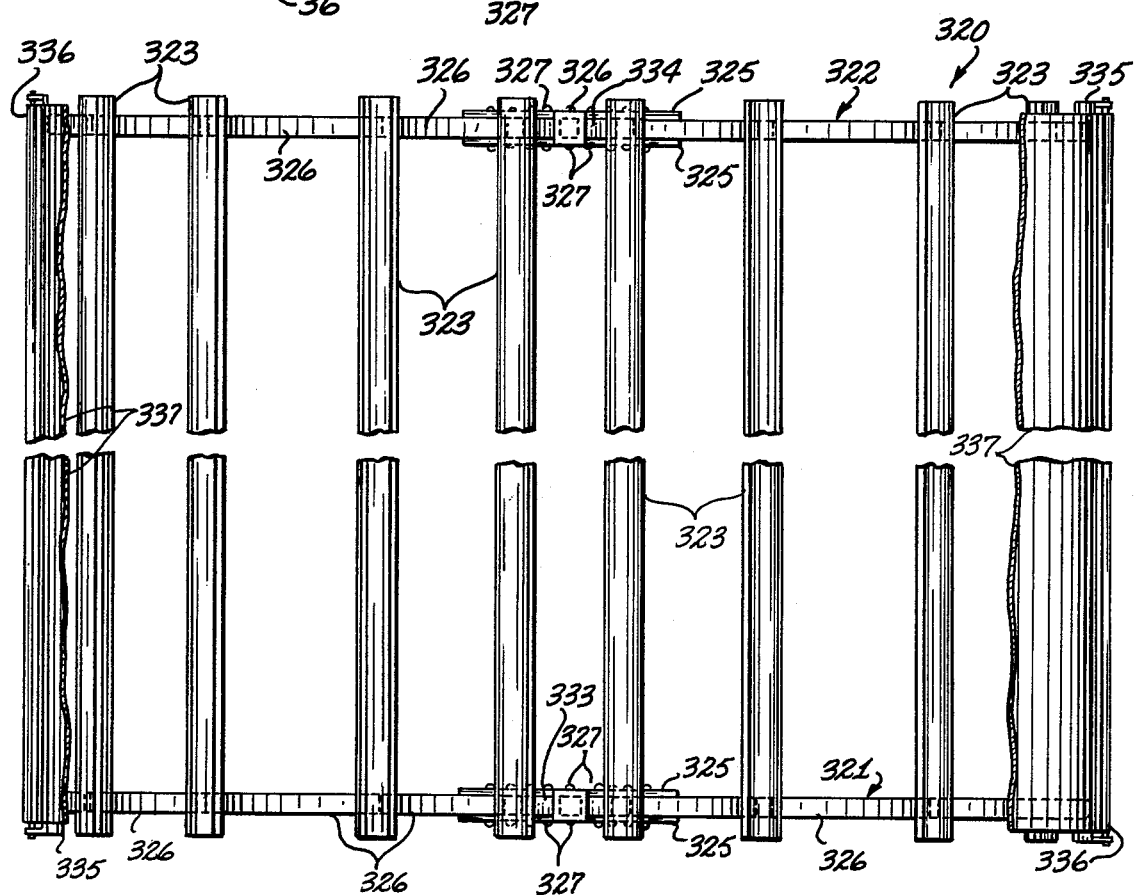

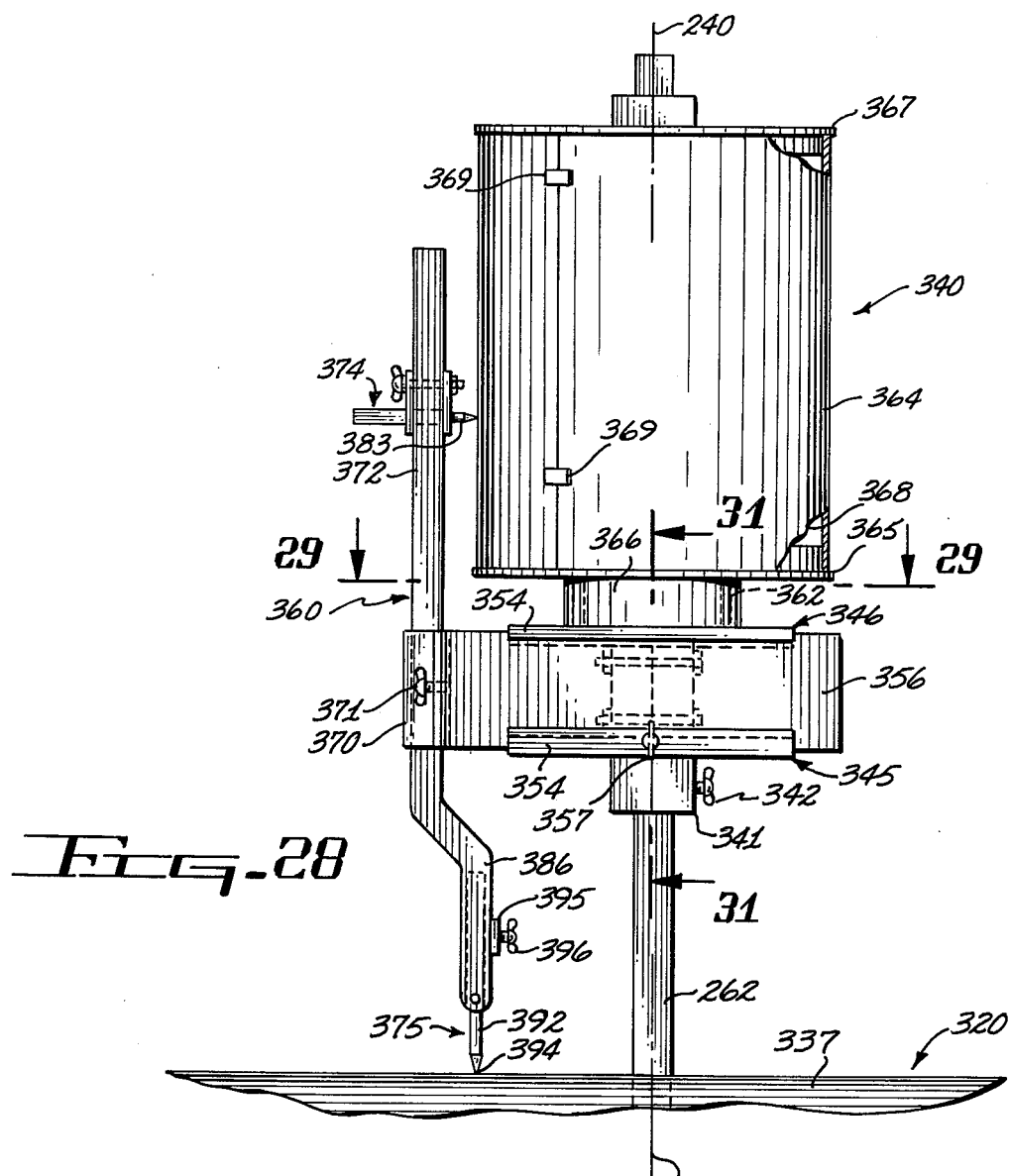
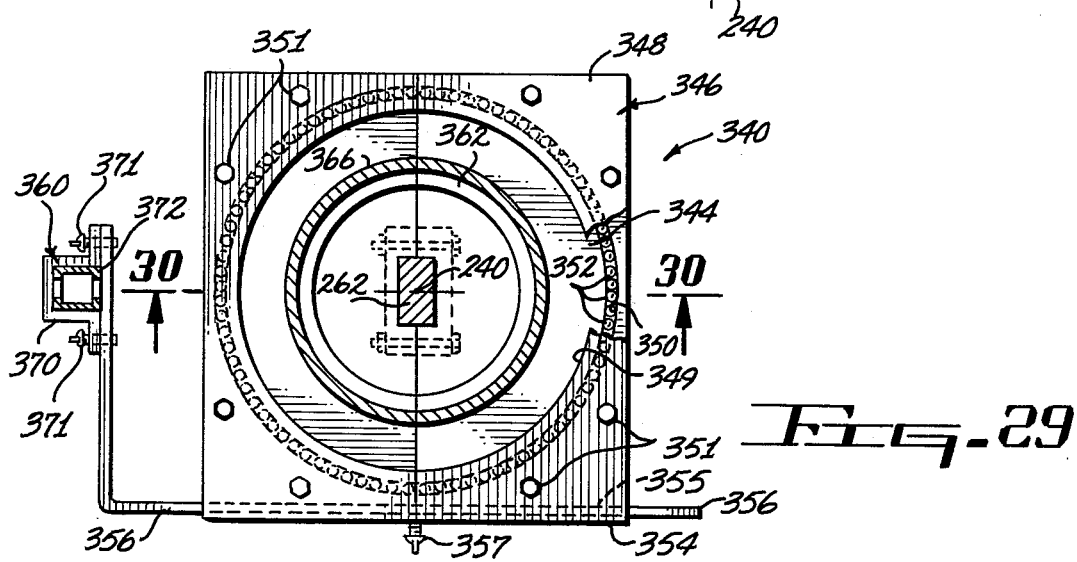

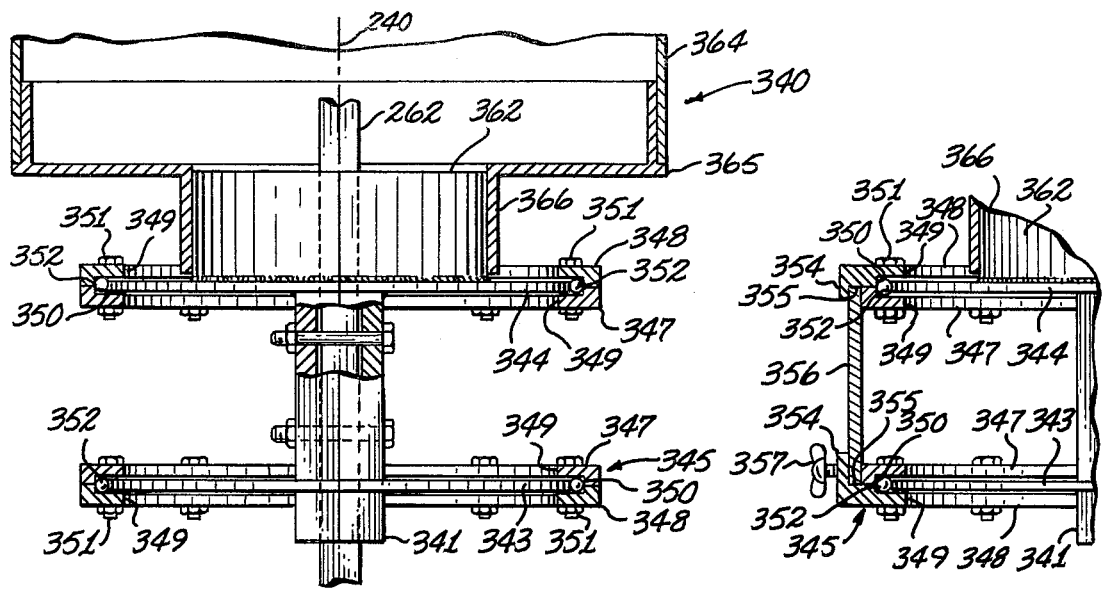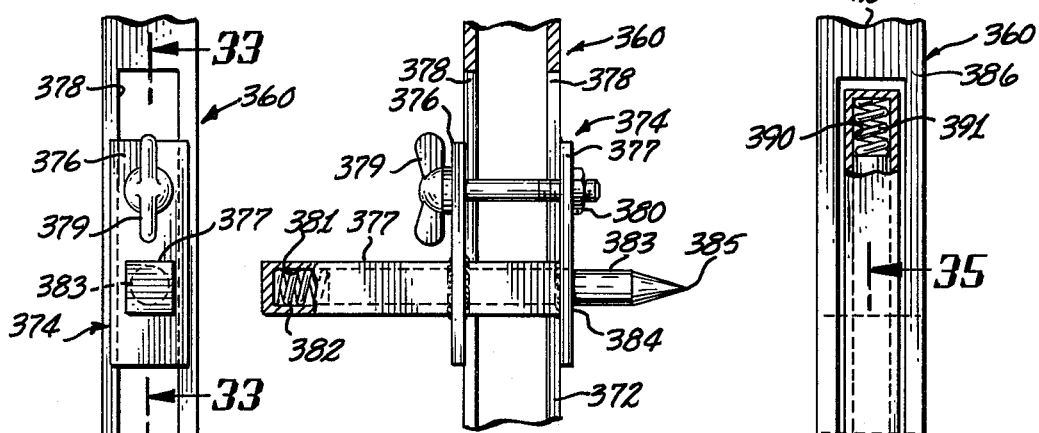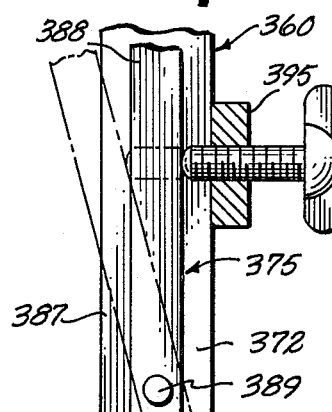

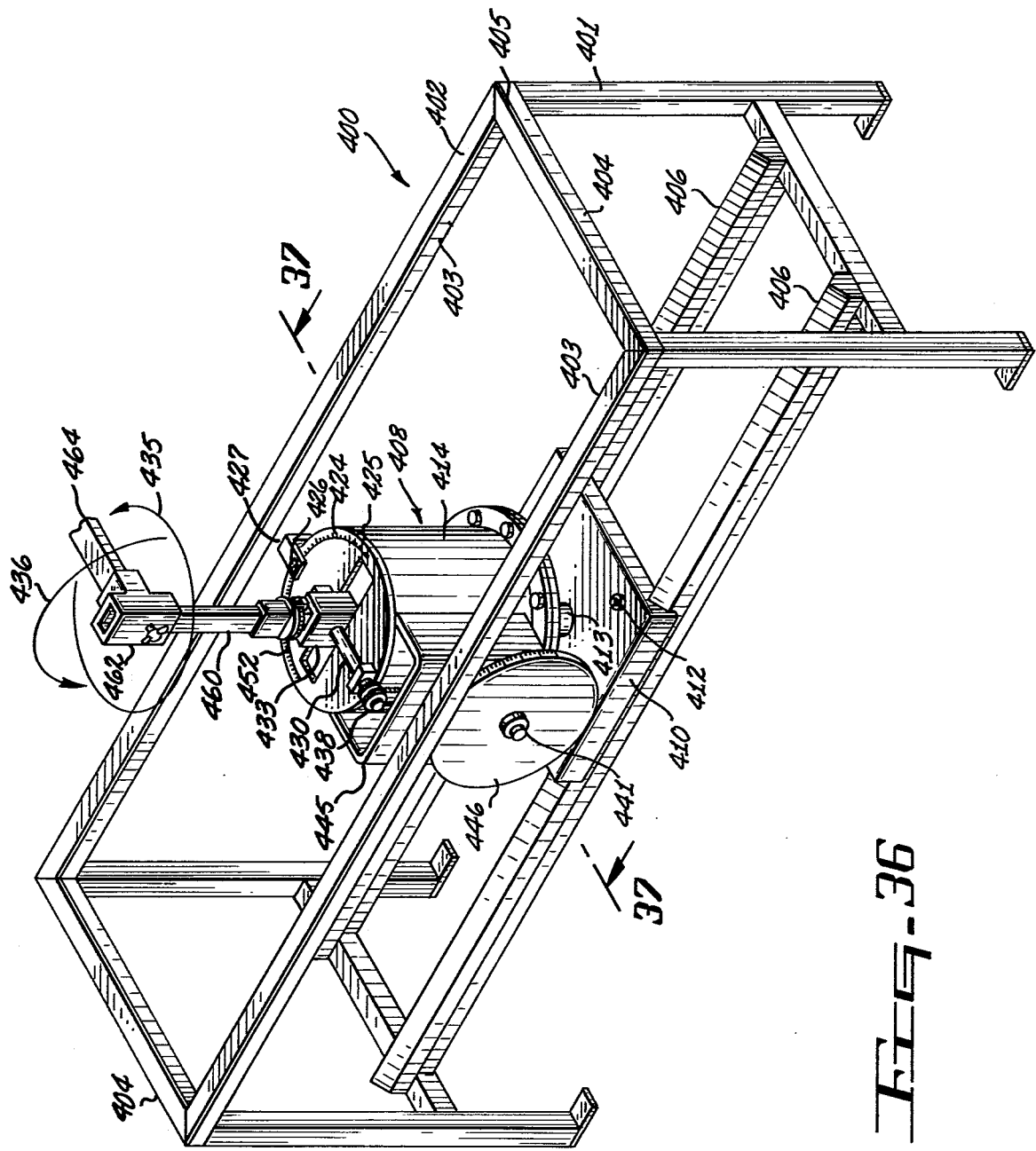

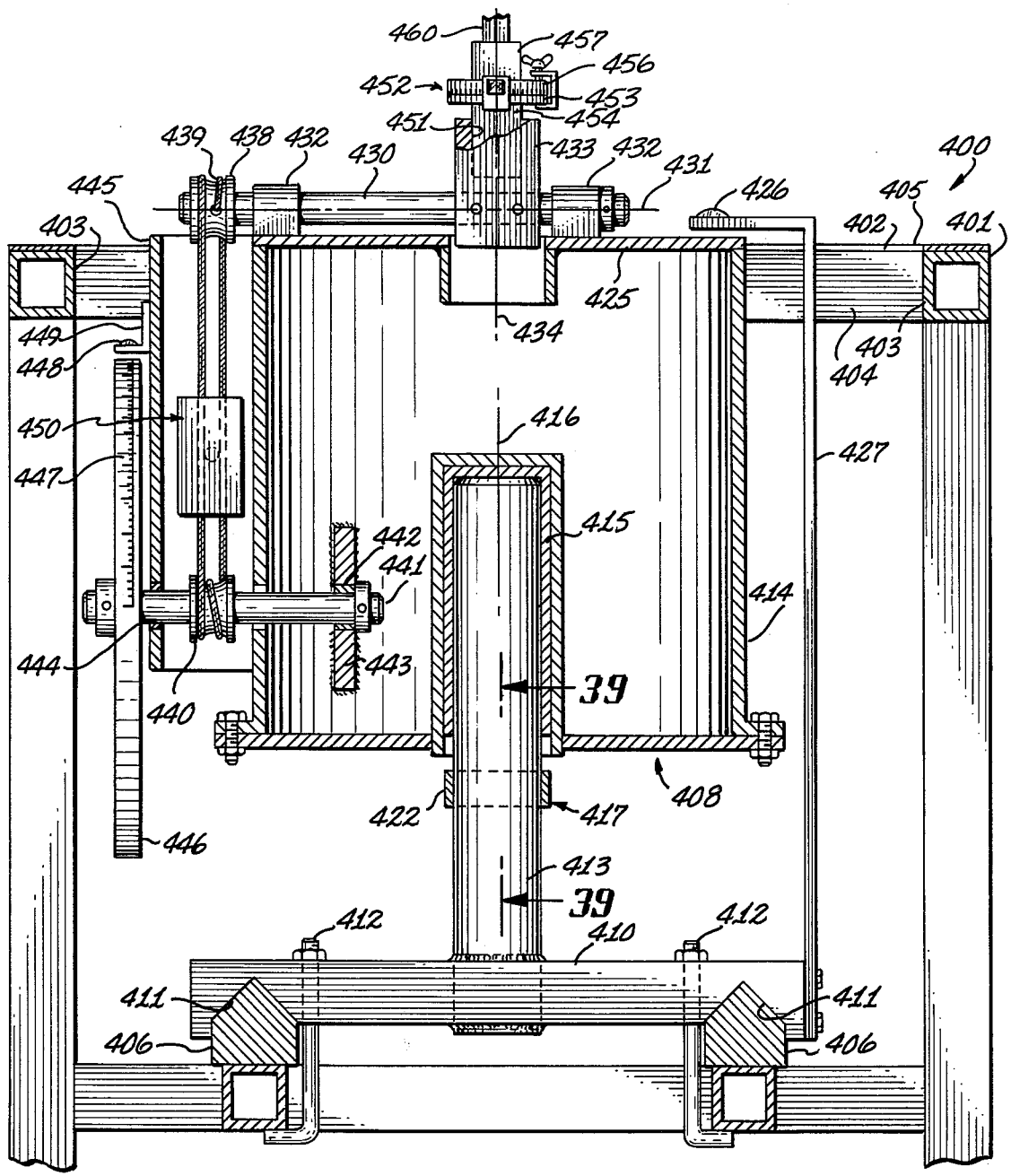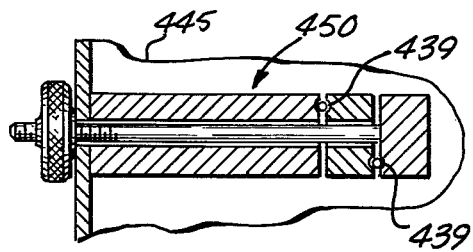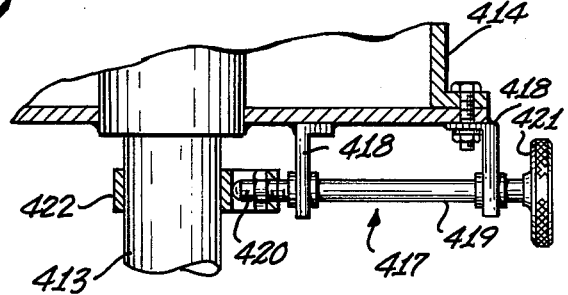

APPARATUS FOR SIMULATING INTERSECTING STRUCTURAL ELEMENTS

BACKGROUND OF THE INVENTION

1. Field of the Invention

This invention relates to mechanisms for solving problems of structural layout, or planning, and more particularly to mechanisms for simulating the attitudes or dispositions of intersecting structural elements to determine the exact configurations which are to be cut or otherwise formed in the elements at their intersecting point.

2. Description of the Prior Art

It is well known that the planning of structures such as buildings, bridges, pipe line systems, and the like are very complex and time consuming jobs which are aggrevated when the intersecting structural elements involved in the job are disposed in irregular attitudes and intersect at angles which are other than normal, or right angles.

By way of example, consider the intersection of a primary structural beam and a secondary structural beam, when the primary beam is disposed at an inclined angle and is rolled about its longitudinal axis, and the secondary beam is disposed horizontally and intersects the primary beam at an acute angle. The cut which must be made in the secondary beam where it intersects the primary beam in such a situation must be accurately pre-planned to insure a proper mating and structural interconnection of those beams.

A further example of this type of problem involves the intersection of conduits such as pipe of the type commonly employed to carry oil, gas, and the like. Consider a primary pipe which is horizontally disposed and a secondary pipe which tangentially intersects the primary pipe at an acute angle. Such a problem involves a cutout in the primary pipe and a mating cut in the secondary pipe, and both of those cuts must be accurately pre-planned to produce a tight fitting joint.

The pre-planning or solving of problems of the above described types are customarily accomplished by highly experienced and skilled engineers who spend many hours making detailed blueprints. The blueprints, by their very nature are complex and a high degree of skill is needed by the craftsmen to read and use such prints to produce the desired intersection. The complexity and degree of accuracy required in this type of layout work results in high construction costs and a relatively high error rate. Of course, if an error is relatively minor, the structural materials may be salvaged by making corrections in the field, but all too often this is not the case.

To the best of my knowledge, no apparatus or method has been developed or proposed which would reduce the error rate, time, and costs involved in the pre-planning of structural members.

SUMMARY OF THE INVENTION

In accordance with the present invention, a new and useful apparatus is disclosed for simulating the surface configurations and the attitudes of intersecting structural members to determine the configuration of the members at the intersection thereof.

The apparatus includes: means for simulating the surface configuration and attitude of a primary structural member, means for simulating the axial location of a secondary structural member, means for simulating the surface configuration of the secondary structural member, and means for determining the intersection configuration of the primary and secondary members with the determined configuration being employed in fabrication of the actual structural members.

When the intersecting structural members are I beams, tubular beams, or any other elements having planar surfaces, the primary structural member simulating means is in the form of an adjustably positionable planar surface. The secondary structural member locating means is carried on the primary structural member simulating means and is adjustable to locate the longitudinal axis of the secondary structural member relative to ground and/or relative to the primary structural member simulating means. The secondary structural member simulating means is supportingly carried so as to lie along the longitudinal axis determined by the secondary member locating means and is adjustable to simulate the cross sectional configuration of the secondary structural member. The pattern determining means is carried by the secondary structural member simulating means and projects the simulated surface configuration of the secondary member onto the simulated surface configuration of the primary member.

When the intersecting structural members are conduits, pipes, or any other elements having substantially circular, or elliptical, cross sectional configurations, the primary structural member simulating means is in the form of an arcuate surface which simulates the attitude and surface contour of the primary member. The secondary structural member locating means is carried on the primary structural member simulating means and is adjustable to locate the longitudinal axis of the secondary structural member relative to the primary structural member simulating means. The secondary structural member simulating means is positioned to lie along the longitudinal axis determined by the secondary member locating means and provides a substantially circular surface which simulates the cross sectional configuration of the secondary structural member. The pattern determining means is carried by the secondary member simulating means and is rotatable about the longitudinal axis of the secondary member, and is scribingly engaged with the simulated surfaces of the primary and secondary structural members so that the intersection configurations, or patterns, are simultaneously scribed on those surfaces which are subsequently used as patterns in fabrication of the actual intersecting members.

As described above, the apparatus of the present invention is adapted to simulate either the intersection of two structural beams or two conduits. Further, by interchanging mechanisms, the apparatus can also be employed to simulate the intersections of a beam with a conduit or the intersection of a conduit with a beam.

Accordingly, it is an object of the present invention to provide a new and useful apparatus which facilitates the required pre-planning of intersecting structural elements.

Another object of the present invention is to provide a new and useful apparatus which reduces the time, cost, and error factors involved in the calculating and pre-planning of the cutting patterns which are to be made in intersecting structural elements.

Another object of the present invention is to provide a new and useful apparatus for simulating the surfaces and the attitudes of intersecting structural elements to determine the configuration of those elements at the intersection thereof.

Another object of the present invention is to provide a new and useful apparatus for simulating the surfaces and the attitudes of intersecting structural beams to determine the cutting pattern that is to be made in a secondary beam at the point where it intersects a primary beam to insure that a proper and structurally sound interconnection of those beams can be made.

A further object of the present invention is to provide a new and useful apparatus for simulating the surfaces and the attitudes of intersecting conduits for determining the cutting patterns that are to be made in those conduits so that a structurally sound and tight connection can be made therebetween.

Still another object of the present invention is to provide a new and useful apparatus for simulating the surfaces and the attitudes of a structural beam which intersect a conduit for determining the intersecting configurations of the beam and the conduit.

Yet another object of the present invention is to provide a new and useful apparatus for simulating the surfaces and attitudes of a conduit which intersects a beam and determining the configuration of the conduit and the beam at the intersection thereof.

The foregoing and other objects of the present invention, as well as the invention itself, will be more fully understood from the following description when read in conjunction with the accompanying drawings.

BRIEF DESCRIPTION OF THE DRAWINGS

FIG. 1 is an isometric view illustrating the various features of the apparatus of the present invention which is employed for simulating the attitudes of intersecting structural beams.

FIG. 1a is an isometric diagramatic view illustrating an example of a typical problem solvable on the apparatus of FIG. 1.

FIG. 2 is an enlarged fragmentary plan view of the apparatus of the present invention.

FIG. 3 is an enlarged sectional view taken on the line 3—3 of FIG. 2.

FIG. 4 is an enlarged fragmentary sectional view taken on the line 4—4 of FIG. 3.

FIG. 12 is a view taken along the line 12—12 of FIG. 5 and which is partially broken away to illustrate the various features of the apparatus of the present invention.

FIG. 13 is an enlarged sectional view taken along the line 13—13 of FIG. 12.

FIG. 14 is an enlarged sectional view taken along the line 14—14 of FIG. 12.

FIG. 15 is an enlarged sectional view taken along the line 15—15 of FIG. 8.

FIG. 16 is a sectional view taken along the line 16—16 of FIG. 15.

FIG. 17 is a sectional view taken along the line 17—17 of FIG. 15.

FIG. 18 is an enlarged sectional view taken along the line 18—18 of FIG. 15.

FIG. 19 is an exploded isometric view illustrating a method for fabricating the vernier adjustment devices used at various locations in the apparatus of the present invention.

FIG. 20 is a front elevational view of the pattern determining means employed on the apparatus of FIG. 1.

FIG. 21 is a fragmentary side elevation of the pattern determining means shown in FIG. 20.

FIG. 22 is a sectional view taken on the line 22—22 of FIG. 20.

FIG. 25 is an enlarged fragmentary isometric view partially broken away, and illustrating the device of the present invention as having been equipped to simulate the attitudes of intersecting conduits.

FIG. 25a is an isometric diagramatic view showing a typical type of problem which can be solved by the apparatus of FIG. 25.

FIG. 26 is an end view of the device used in conjunction with the apparatus of the present invention for providing an arcuate surface on the primary structural member simulating means.

FIG. 27 is a fragmentary plan view of the device shown in FIG. 26.

FIG. 28 is a side elevational view of the secondary conduit simulating means and the pattern determining means employed with the apparatus of the present invention for determining the cutting patterns of intersecting conduits.

FIG. 29 is a sectional view taken along the line 29—29 of FIG. 28.

FIG. 30 is a sectional view taken along the line 30—30 of FIG. 29.

FIG. 31 is a fragmentary sectional view taken along the line 31—31 of FIG. 28.

FIG. 32 is a fragmentary front elevational view of a portion of the scribing means employed in conjunction with the pattern determining means shown in FIG. 28.

FIG. 33 is a sectional view taken along the line 33—33 of FIG. 32.

FIG. 34 is a fragmentary view illustrating another portion of the scribing mechanism employed in conjunction with the pattern determining means illustrated in FIG. 28.

FIG. 35 is an enlarged sectional view taken along the line 35—35 of FIG. 34.

FIG. 36 is an isometric view illustrating a modification of the apparatus of the present invention.

FIG. 37 is an enlarged sectional view taken along the line 37—37 of FIG. 36.

FIG. 38 is an enlarged fragmentary sectional view of the cable locking mechanism employed in the apparatus of FIG. 36.

FIG. 39 is an enlarged fragmentary sectional view of a rotational locking mechanism employed in the apparatus of FIG. 36, and taken along the line 39—39 of FIG. 37.

DESCRIPTION OF THE PREFERRED EMBODIMENTS

Figure 5:
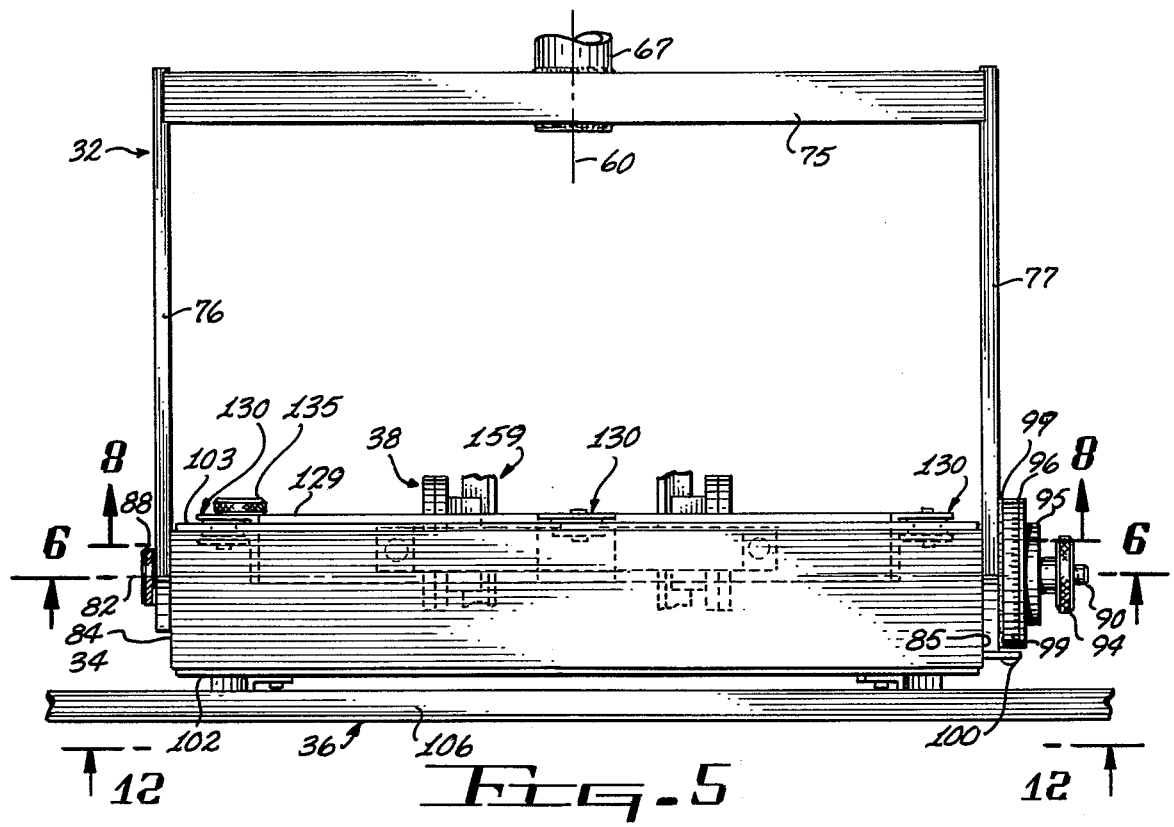
FIG. 5 is a fragmentary plan view of the apparatus of FIG. 1.

Referring more particularly to the drawings, FIG. 1 illustrates a first embodiment of the apparatus of the present invention which is indicated generally by the reference numeral 10, with this embodiment being employed to simulate the intersection of structural members such as I beams, tubular beams, and other similar structures having planar surfaces.

For a clear understanding of the types of layout problems solved by the apparatus 10, reference is made to FIG. 1a wherein a typical example of such a problem is diagramatically illustrated.

FIG. 1a illustrates a primary beam 11 having its longitudinal axis 12 lying along a horizontal plane 13 so that its planar surface 14 will be vertically disposed. For descriptive and illustrative purposes, a vertically disposed plane 15 is illustrated which normally intersects the horizontal plane 13 to form four quadrants I, II, III, IV. A secondary beam 17 is located in quadrant IV and has its longitudinal axis 18 sloping angularly upwardly therein into intersection with the planar surface 14 of the primary beam 11 at point "A."

The problem that the apparatus 10 is adapted to solve is that of properly cutting the secondary beam 17 to form end edges 19, 20, 21, and 22 so that they will fit flush with the planar surface 14 of the primary beam 11.

The apparatus 10 of the present invention solves this type of problem by determining the locations and relative lengths of the longitudinally extending corner edges 23, 24, 25, and 26 of the secondary beam 17, with those lengths being measured from an imaginary plane 27 that is normal to the longitudinal axis 18 of the secondary beam 17.

As is well known in the art, the calculations and layout involved in the planning of intersecting structural beams can be a very complex matter, with the foregoing example being approximately midway in the complexity scale. A simpler version of such problems would be with the beam 17 lying in either the horizontal plane 13 or in the vertical plane 15. A more complex problem would result from providing the primary beam 11 with a slope relative to the horizontal plane 13 and/or rotating that beam 11 about its longitudinal axis 12. In the case of the more complex problems, the relationships of the intersecting beams with respect to each other, and the relationships of those beams with respect to ground, all enter into solving of the problems.

It will become apparent as this description progresses, that the apparatus 10 is equipped to simulate all of the above described relationships.

As will hereinafter be described in detail, the apparatus 10 is formed of several major subassemblies which provide means for simulating the configuration and dispostion of the primary beam 11, means for locating the longitudinal axis 18 of the secondary beam 17, means for simulating the configuration of the secondary beam 17, and pattern determining means for determining the pattern, i.e., the location of end edges 19, 20, 21, and 22 which must be formed in the secondary beam 17 to insure that a proper intersecting fit of those beams will result.

As shown in FIG. 1, the apparatus 10 includes a stand means 30 which supportingly carries a yoke assembly 32 on the upper end thereof. The yoke assembly 32 carries a box shaped housing 34 which in turn carries a planar frame 36 of generally open rectangular configuration. The stand 30, yoke 32, housing 34, and frame 36 all cooperate to form the means for simulating the surface 14 and the attitude of the primary member or beam 11.

The housing 34 also carries a secondary structural member, or beam, locating means 38 which is adjustable to simulate the location of the longitudinal axis 18 of the secondary beam 17. A secondary structural member simulating means 40 is carried by the locating means 38, with the secondary member simulating means 40 lying along the simulated longitudinal axis of the secondary beam and adapted to form the imaginary plane 27 and simulate the locations of the corner edges 23, 24, 25, and 26 of the secondary beam 17. A pattern determining means 41 is carried by the secondary member simulating means 40 and projects the edges 23, 24, 25, and 26 located thereby into contact with the primary member simulating means.

Particular reference is now made to FIGS. 2, 3, and 4 wherein the stand means 30 is best seen. The stand means 30 includes a base plate 42, which is adapted for attachment to a suitable supporting floor surface 43, and has an upstanding tubular standard 44 affixed thereto. A tubular telescoping member 45 is coaxially mounted within the bore 46 of the standard 44 and is supported therein by suitable lower bearings 47 and upper bearings 48 so as to be telescopically extendible and retractable with respect to the standard 44.

The coaxial movement of the telescoping member 45 is accomplished by a suitable windlass means 49 which is seen to include a hand operated barrel 55 rotatably carried by a bracket 51 so as to be affixed to the upstanding standard 44. A cable 52 is connected to and wound around the barrel 55 and extends therefrom into the bore 46 of the standard 44, and has its extending end 53 affixed to the lower end of the telescoping member 45 such as by being passed through an aperture 54 formed in the member 45 and knotted therein.

A coupler 56 is mounted in the upper end of the telescoping member 45, with the coupler being coaxially disposed with respect to the longitudinal axis 57 of the telescoping member 45 and free to rotate about that axis.

The upper end of the coupler 56 is affixed, such as by welding, to the lower end of a housing 58 which has a bore 59 formed therein. The bore 59 defines a horizontal axis 60 which is perpendicular to the vertical axis 57 of the telescoping member 45.

A lockable rotating assembly 61 is carried coaxially in the bore 59 of the housing 58, and the lockable rotating assembly 61 is seen to include a pressure plate 62 having an extending shaft 63 fast therewith. The shaft 63 extends through the bore 59 of the housing 58 and has a threaded end 64 upon which a locking wheel 65 is carried. When the locking wheel 65 is moved away from the pressure plate 62, the pressure plate 62 and the shaft 63 will be free to rotate about the horizontal axis 60. When the locking wheel 65 is threadingly moved toward the pressure plate 62, the wheel moves into engagement with the housing 58 and will axially slide the shaft to pull the pressure plate 62 into locked frictional engagement with a friction facing disc 66 carried on the housing 58.

A stub shaft 67 is coaxially affixed to the pressure plate 62 such as by welding, and is therefore movable therewith for rotation about the horizontal axis 60.

A rotation indicator means 68 is provided which is seen to include a plate 69 affixed to the housing 58. The plate 69 has an arcuate surface 70 which is coaxial with respect to the horizontal axis 60, and is provided with a scale 71 marked thereon, with the scale 71 being graduated in suitable circular degree increments. The rotation indicator means 68 further includes a magnifying lense 72, which may be provided with a vernier scale as will hereinafter be described in detail. The magnifying lense 72 is carried in a suitable bracket 73 which is in turn carried on the stub shaft 67 and is thus rotatable therewith.

It may now be seen that the rotating assembly 61, and the stub shaft 67, with assistance from the rotation indicator means 68 can be accurately rotated into various precise locations and locked in those locations.

The yoke assembly 32 is affixed to the extending end of the stub shaft 67 and is thus rotatable therewith about the horizontal axis 60. The yoke 32, as best seen in FIG. 5, includes a transverse beam 75 which is connected intermediate its opposite ends to the stub shaft 67, and has a spaced pair of parallel arms 76 and 77 which extend from the opposite ends of the transverse beam 75.

Figure 6:
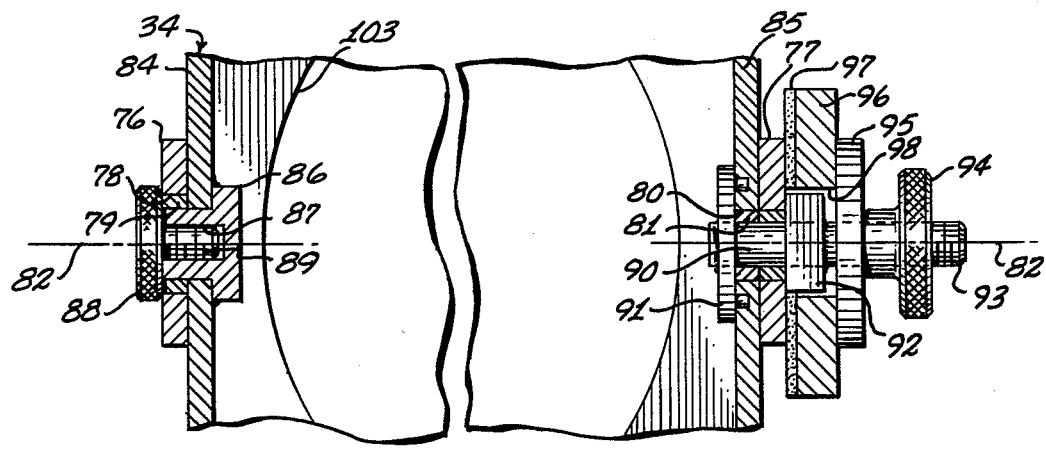
FIG. 6 is an enlarged fragmentary sectional view taken on the line 6—6 of FIG. 5.
Figure 7:
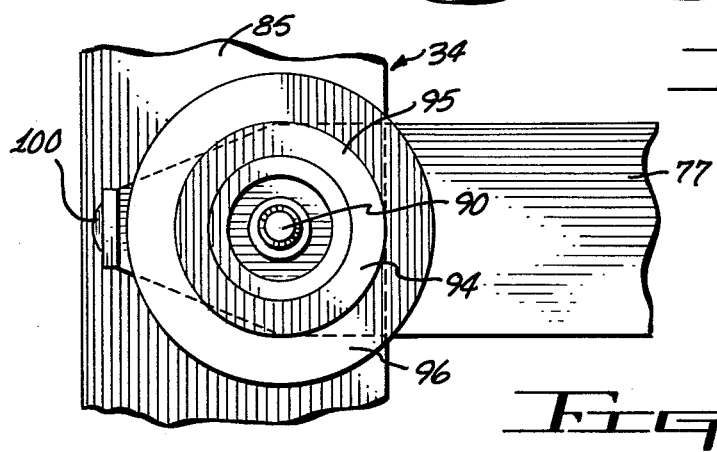
FIG. 7 is an enlarged fragmentary side view of the apparatus illustrated in FIG. 6.

The extending end of the arm 76, as seen in FIG. 6, has an aperture 78 formed therein and in which a suitable bushing 79 is carried. The extending end of the arm 77 is likewise provided with an aperture 80 having a suitable bushing 81 therein. The apertures 79 and 80 of the arms 76 and 77, respectively, are in alignment with each other and define a yoke axis 82. The yoke axis 82, by virtue of the rotatability of yoke 32, is rotatable in a plane which is normal to the horizontal axis 60.

The housing 34, as will hereinafter be more fully described, is provided with an opposed pair of parallel walls 84 and 85, with the wall 84 being adjacent the inner surface of the arm 76 of the yoke 32, and the wall 85 being disposed adjacent the inner surface of the arm 77 of the yoke.

The wall 84 of the housing 34 has a boss 86 fast therewith, with the boss being rotatably carried in the bushing 79 of the arm 76. The boss 86 has an internally threaded bore 87 formed therein in which a locking nut 88, having a threaded shank 89, is carried. The nut 88 and boss 86 are employed to loosely hold the wall 84 in engagement with the arm 76 so that the housing 34 is free to rotate in the bushing 79.

The wall 85 of the housing 34 has a shaft 90 fast therewith, and the shaft 90 extends through and is rotatable in the bushing 81 of the arm 77 of the yoke assembly 32. The shaft 90 has a plate 91 on its inner end which is connected to the wall 85 to prevent the shaft 90 from rotating relative to the housing 34. The shaft 90 also has a square boss 92 affixed thereto with that boss being disposed adjacent the outer surface of the arm 77 of the yoke assembly 32. The shaft 90 has a threaded end 93 upon which a locking wheel 94 is carried. When the locking wheel 94 is threadingly moved away from the arm 77 of the yoke 32, the shaft 90, and thus the housing 34, will be free to rotate about the yoke axis 82. When the locking wheel 94 is threadingly moved toward arm 77 of the yoke 32, it will move into engagement with a friction washer 95 loosely carried on the shaft 90, and will move that washer 95 into engagement with a circular pressure plate 96 which is also loosely carried on the shaft 90. When the friction washer 95 is brought to bear against the pressure plate 96, the pressure plate will move axially to bring a friction facing disc 97 mounted thereon into frictional locking engagement with the outer surface of the arm 77.

When the locking wheel 94 is loose, the housing 34 will be freely rotatable about the yoke axis 82 as previously described, and such rotation will produce identical rotational movement of the circular pressure plate 96 due to the pressure plate 96 having a square aperture 98 formed therein into which the square boss 92 of the shaft 90 is drivingly nestingly positioned.

The purpose for rotational driving of the pressure plate 96 is to provide means for indicating the rotated position of the housing 34 about the yoke axis 82. Such indicating means is accomplished by providing a scale 99 on the peripheral surface of the circular pressure plate 96 with that scale 99 being graduated in suitable circular degree increments. The indicating means further includes a magnifying lense 100, which may be provided with a vernier scale as will hereinafter be described in detail, with the lense 100 being mounted on the extending end of the arm 77 of the yoke assembly 32 and disposed to overlay the scale 99 on the pressure plate 96.

The housing 34 is provided with a spaced pair of planar plates 102 and 103 which, as seen best in FIG. 5, extend between and interconnect the opposed pair of parallel side walls 84 and 85 of the housing 34.

As shown in FIGS. 12, 13, and 14, the planar plate 102 of the housing 34 has a large circular aperture 104 formed therein which serves as a closed endless track on which four spaced wheel assemblies 105, carried by the planar frame 36, are free to run.

As seen best in FIG. 1, the planar frame 36 includes a spaced pair of elongated beams 106 and 107 which are interconnected by transverse beams 108, 109, 110, and 111. Again referring to FIG. 12, the frame 36 is shown as also including four diagonal braces 112 which extend between the transverse beams 109 and 110 and the elongated beams 106 and 107, with those diagonal braces 112 each having a different one of the four wheel assemblies 105 mounted thereon.

A typical one of the wheel assemblies 105, is shown in FIG. 14 to include a bracket 114 which is affixed to the appropriate diagonal brace 112 such as with suitable bolts 115. The bracket 114 has a wheel 116 rotatably journaled thereon, with the wheel 116 being disposed to straddlingly engage the endless track formed by the aperture 104 in the plate 102.

Due to the spaced positioning of the wheel assemblies 105 with respect to each other, and the straddling engagement thereof with the track provided by the aperture 104 formed in the plate 102, the frame 36 is coupled to the housing 34 for movement therewith about the yoke axis 85, and is also rotatable in its own plane.

FIG. 13 illustrates a locking mechanism 117 which is mounted on the planar frame 36 and is lockably engagable with the planar plate 102 of the housing 34 to lock the frame 36 in the desired rotated position in its own plane. The locking mechanism 117 includes a bracket 118 having a fixed shoe 119 formed on the extending end thereof. A knurled nut 120 having a threaded shank 121 is rotatably mounted in and extends from the fixed shoe 119. A movable shoe 122 is threadingly carried on the shank 121 of the knurled nut 120 so that the movable shoe 122 may be moved toward and away from the fixed shoe 119. When the movable shoe 122 is moved toward the fixed shoe 119, the plate 102 of the housing 34 will be grippingly positioned therebetween which locks the frame 36 against rotation in its own plane.

As shown in FIG. 12, an indicator means in the form of a circular scale 124 is provided on the plate 102 of the housing 34, and is disposed thereon to circumscribe the aperture 104 formed in the plate 102. The scale 124 is graduated in suitable circular degree increments. The frame 36 is provided with a first magnifying lense 125 in the longitudinal beam 106, and a second magnifying lense 126 in the transverse beam 110. Both of those lenses 125 and 126 are disposed to overlay the scale 124, and both may include a vernier scale as will hereinafter be described. The scale 124, lenses 125 and 126 in conjunction with the locking mechanism 117, provides means by which the planar frame 36 may be accurately rotated to various precise locations within its own plane and locked in those locations.

It should now be apparent that the planar frame 36 is designed to simulate the surface 14 of the primary structural beam 11 shown in FIG. 1a, and that due to the hereinbefore described rotational capabilities of the yoke assembly 32, housing 34 and frame 36, the frame 36 is capable of being accurately positioned to simulate any possible disposition or attitude of the surface 14 of the beam 11.

Figure 8:
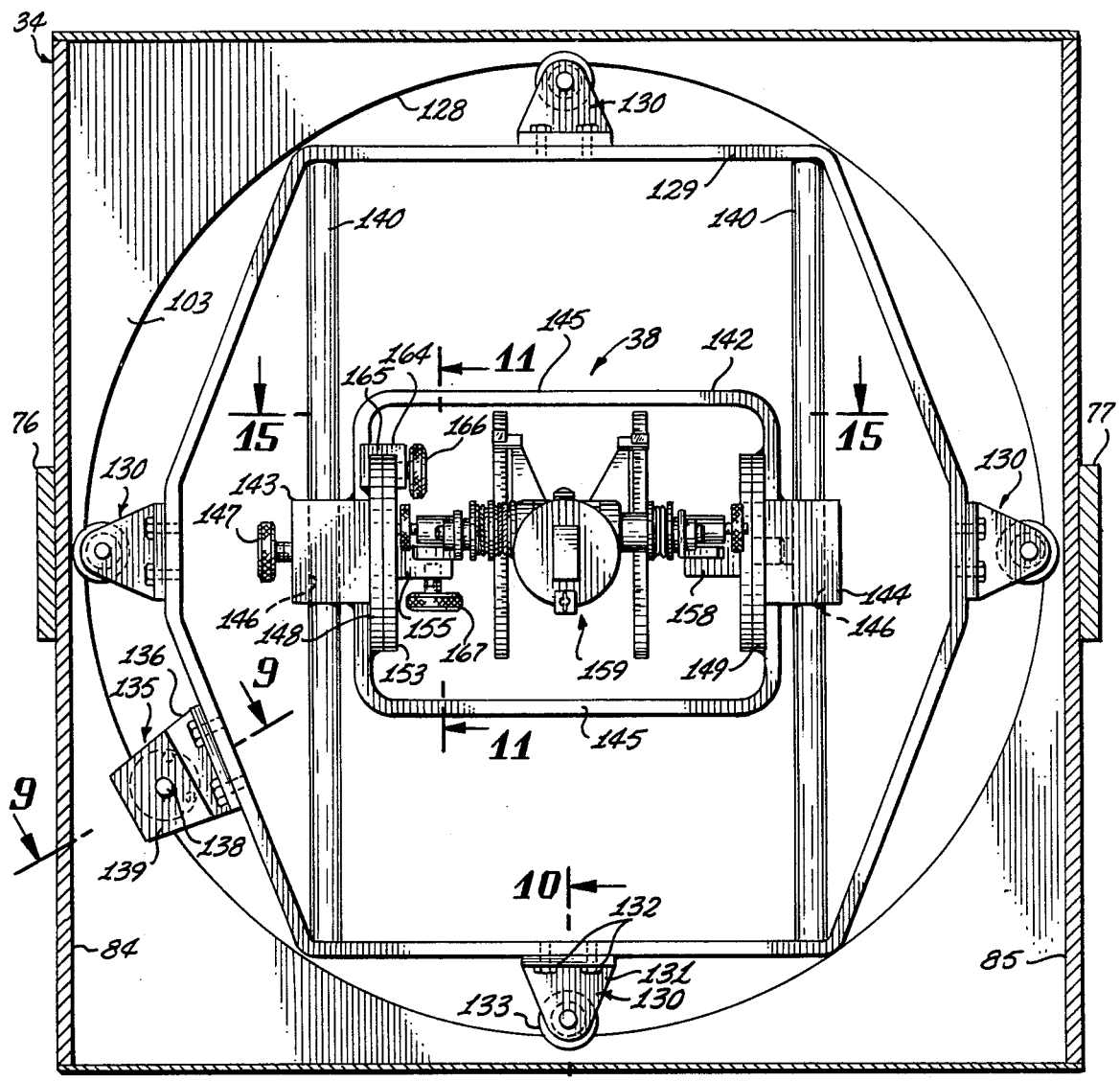
FIG. 8 is a sectional view taken along the line 8—8 of FIG. 5.
Figure 9:
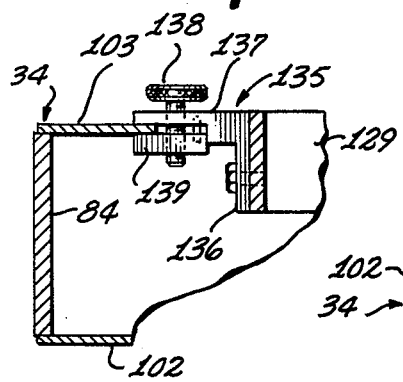
FIG. 9 is a fragmentary sectional view taken on the line 9—9 of FIG. 8.
Figure 10:
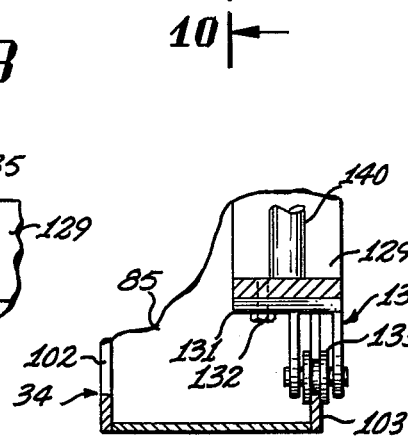
FIG. 10 is a fragmentary sectional view taken on the line 10—10 of FIG. 8.

Referring now to FIGS. 8, 9, and 10, wherein the planar plate 103 of the housing 34 is best seen. The plate 103 is similar to the previously described plate 102 in that an aperture 128 is formed therein which serves as a closed endless track for rotational coupling of a frame 129 to the housing 34, with the frame 129 forming part of the secondary member locating means 38. The frame 129 is provided with four spaced wheel assemblies 130 for connection of the frame to the housing 34 and rotation thereof in its own plane.

A typical one of the wheel assemblies 130 is shown in FIG. 10 to include a bracket 131 which is affixed, such as by suitable bolts 132, to the frame 129, and having a wheel 133 rotatably journaled on the bracket 131. The wheels 133 of each of the wheel assemblies 130, are disposed to straddlingly engage the endless track formed by the aperture 128 of the plate 103 and thereby connect the frame 129 to the housing 134 and allow that frame to be rotated in the track.

FIG. 9 illustrates a locking mechanism 135 which is mounted on the frame 129 and is lockably engagable with the plate 103 to lock the frame 129 in the desired position of rotation in its own plane. The locking mechanism 135 includes a bracket 136 having a fixed shoe 137, and having a suitable screw 138 to which a movable shoe 139 is threadingly attached. When the screw 138 is loose, the shoes 137 and 139 will loosely straddle the track formed by the aperture 128 of the plate 103, and the frame 129 is free for rotational movement relative thereto. When the screw 138 is tightened, the movable shoe 139 will be moved toward the fixed shoe 137 and will grippingly lock the plate 103 therebetween to prevent movement of the frame relative to the housing 34.

The frame 129 has a spaced pair of parallel rods 140 mounted therein, with the rods acting as tracks along which a carriage 142 is slidingly movable, with the carriage also forming part of the secondary member locating means 38. As seen best in FIGS. 8 and 15, the carriage 142 includes a pair of guide blocks 143 and 144 which are interconnected by a pair of spaced braces 145. Each of the guide blocks 143 and 144 have an elongated passage 146 formed therethrough in which the rods 140 are positioned so that the blocks are slidably movable along the rods. The guide block 143 has a set screw 147 mounted therein so that the carriage 142 may be locked in the desired position on the rods 140.

Thus, by virtue of the rotatable frame 129 having the carriage 142 slidably movable therein, it will be seen that the carriage is movable in a plane which may be defined as being spaced from and parallel with respect to the plane established by the open frame 36 of the primary member simulating means.

Each of the blocks 143 and 144 have a fixed disc 148 and 149, respectively, affixed on the inwardly facing surface thereof so that the discs 148 and 149 are facing each other and are parallel. Each of the fixed discs 148 and 149 have a bore 150 formed therein with those bores extending into their respective guide blocks, with the bores being in alignment with each other so as to define a carriage axis 151. A movable disc 153 having a stub shaft 154 axially extending from one planar surface and a channel 155 on the opposite surface, is rotatably connected to the fixed disc 148 by virtue of the stub shaft 154 being positioned in the bore 150 of the fixed disc 148. Likewise, a movable disc 156 having a stub shaft 157 axially extending from one planar surface, and a channel 158 on its opposite surface, is rotatably coupled to the fixed disc 149 by having the stub shaft 157 inserted into the bore 150 of the disc 149. Thus, the movable discs 153 and 156 are mounted for rotation about the carriage axis 151.

The secondary member locating means 38 further comprises an axis positioning means which is best seen in FIGS. 15 and 16 and is indicated generally in those figures by the reference numeral 159. The axis positioning means 159 includes a spaced pair of parallel side rails 160 and 161 which are interconnected at one end by a transverse brace 162. The side rails 160 and 161 are slidably mounted in the channels 155 and 158, respectively, of the movable discs 153 and 156. Therefore, the side rails 160 and 161 aligningly couple the movable discs 153 and 156 so that any rotation of those discs about the carriage axis 151 must be simultaneously accomplished, and such rotation will cause the interconnected side rails 160 and 161 and thus the axis positioning means 159, to also rotate about the carriage axis 151, in a plane which may be defined as being perpendicular to the plane of the open frame 36.

Figure 11:
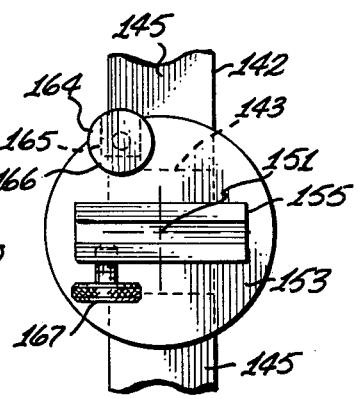
FIG. 11 is a sectional view taken along the line 11—11 of FIG. 8.
Figure 23:
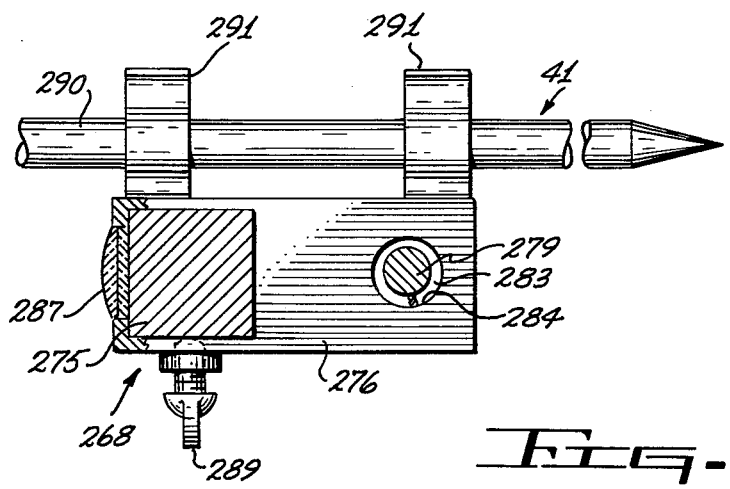
FIG. 23 is an enlarged sectional view taken on the line 23—23 of FIG. 22.

Rotation of the movable discs 153 and 156 and the side rails 160 and 161 about the carriage axis 151 is controlled by locking means 164 which is best seen in FIGS. 8, 11, and 15. The locking means 164 includes a clip 165 which straddles the fixed disc 148 and movable disc 153, with one arm of the clip 165 being affixed to the fixed disc 148. The other arm of the clip 165 is positioned adjacent the inwardly facing surface of the movable disc 153 and has a set screw 166 threadingly carried therein. When the set screw 166 is loose, the movable discs 153 and 156, and the side rails 160 and 161 are free for rotational movement about the carriage axis 151, and when the set screw 166 is tightened, it will move into engagement with the movable disc 153 and thereby lock the discs 153 and 156, and the side rails 160 and 161 in the desired position.

The side rails 160 and 161 are slidably movable in the channels 155 and 158 of movable discs 153 and 156, respectively, and such sliding movement is controlled by a lock screw 167 (FIGS. 8 and 11) threadingly carried in the channel 155 and movable into engagement with the side rail 160.

The axis positioning means 159 further includes an aligned pair of stub shafts 170 and 171 mounted transversely between the side rails 160 and 161 at the end thereof which is opposite to the transverse interconnecting brace 162. The stub shafts 170 and 171 define a transverse axis 172 of the axis positioning means 159, and each are free to rotate about that axis 172. A rotatable housing 173 having an opposed pair of bosses 174 and 175 is located intermediate the side rails 160 and 161 and is positioned transverse with respect to the transverse axis 172 by having the stub shaft 170 inserted into a bore 176 formed in the boss 174 and made fast therein such as with a set screw 177, and having the stub shaft 171 inserted into a bore 178 formed in the boss 175 and affixed therein by means of a set screw 179. Thus, the stub shafts 170 and 171 and the rotatable housing 173 are all interconnected as described above and are all rotatable about the transverse axis 172.

The stub shaft 171 is of special construction in that it is formed with an integral cable spool 180 around which a cable 181 is wound. The cable 181 extends from the cable spool 180 and is wound around and suitably affixed to another cable spool 182 which is connected, such as by welding, to an indicator means in the form of an index wheel 183. The cable spool 182 and index wheel 183 are carried on a fixed shaft 184 which is transversely carried by the side rails 160 and 161, and the cable spool 182 and index wheel 183 are suitably journaled for rotation about the fixed shaft 184.

The periphery of the index wheel 183 is provided with a suitable scale 185 which is graduated in circular degree increments. A magnifying lense 186, which may be provided with a vernier scale as will hereinafter be described, is positioned so as to overlay the scale 185 of the index wheel 183. The lense 186 is mounted on a support arm 187 which is integral with and radially extends from a sleeve 188. The sleeve 188 is concentrically mounted on the fixed shaft 184 and is held fast therewith by means of a set screw 189.

It will now be seen that rotary movement of the rotatable housing 173 about the transverse axis 172 will be transmitted by means of the spools 180, 182 and the cable 181 to the index wheel 183 so that precision rotated positioning of the rotatable housing may be accomplished.

A cable lock device 190 is carried on the side rail 161 for locking the cable 181 and thereby preventing movement of the rotatable housing 173 and index wheel 183. As best seen in FIG. 18, the cable locking device 190 includes a first compression plate 191 which is positioned adjacent the side rail 161 and is provided with a central aperture 192 which aligns with a similarly sized aperture 193 formed in the side rail 161. A second compression plate 194 is juxtapositionally located adjacent the first compression plate 191, and it also has a central aperture 195 formed therein which aligns with the apertures 192 and 193 of the first compression plate 191 and the side rail 161, respectively. The first and second compression plates 191 and 194 each have an arcuate groove 196 and 197, respectively, formed therein with those grooves formed in the facing surfaces of their respective plates and in alignment with each other to circumscribe the upper strand 198 of the cable 181. A draw plate 199 is juxtapositionally located adjacent the second compression plate 194 and has a threaded draw bolt 200 extending normally therefrom through the aligned apertures of the compression plates and the side rail. The second compression plate 194 and the draw plate 199 each have an arcuate groove 201 and 202, respectively, formed in the facing surfaces thereof with those grooves in alignment with each other so as to circumscribe the lower strand 203 of the cable 181. The threaded draw bolt 200 passes through a spacer sleeve 204, which is located adjacent the side rail 161 on the side thereof which is opposite the compression plates and the draw plate, and the bolt 200 has a knurled knob 205 mounted on the extending threaded end thereof. When the knurled knob 205 is loose on the draw bolt, i.e., moved away from the sleeve 204, the plates 191, 194 and 199 will be loosely spaced from each other an amount sufficient to allow passage of the strands 198 and 203 of the cable 181 therebetween. When the knob 205 is threadingly tightened on the draw bolt 200, i.e., moved toward the spacer sleeve 204, the draw plate 199, and the first and second compression plates 191 and 194 will move toward each other so that the arcuate grooves 196, 197, 201, and 202 formed in those plates will cinch the cable 181 therebetween.

The rotatable housing 173, as shown best in FIGS. 15 and 17, rotatably carries a spool 207 in one end thereof, with the spool defining a swivel axis 208. The swivel axis 208 is spaced from the transverse axis 172 of the secondary structural beam locating means 38, and is disposed at a right angle with respect thereto. Also, since the swivel axis 208 is defined by the spool 207 which is carried by the rotatable housing 173, the swivel axis 208 will move in a plane which is transverse to the axis 172 when the rotatable housing 173 is revolved about the transverse axis.

The spool 207 has its opposite ends 209 and 210 extending beyond the confines of the rotatable housing 173 for connection to a swivel housing 212. The swivel housing 212 includes a spaced pair of parallel plates 213 and 214 with the plate 213 having an aperture 215 formed in one end thereof for loosely circumscribing the end 209 of the spool 207, and the plate 214 having one of its ends affixed, such as by welding, to the end 210 of the spool 207. The opposite or extending ends of the plates 213 and 214 are interconnected by a transverse member 216 so that the swivel housing 212 forms a unitary structure with the spool 207 fixedly carried in one end thereof.

Since the spool 207 is fast with the swivel housing 212, and that same spool is rotatably carried in the rotatable housing 173, it will be seen that rotation of the rotatable housing 173 about the transverse axis 172 will cause the swivel housing 212 to move therewith, and further the swivel housing 212 and the spool 207, are additionally capable of being swivelably moved about the swivel axis 208.

A cable 218 is wound around the spool 207 and extends therefrom to the opposite end of the rotatable housing 173 where it is wound around and suitably affixed to a spool 219 of a transfer spool assembly 220 which is transversely and suitably journaled for rotation in that end of the rotatable housing 173. Movement of the swivel housing 212 about the swivel axis 208 will be transmitted by the spool 207 and cable 218 to produce rotational movement of the transfer spool assembly 220.

In addition to the spool 219, the transfer spool assembly 220 further includes a second spool 221 which is integral with the spool 219, coaxial therewith and laterally spaced therefrom so as to be disposed externally of the rotatable housing 173.

The stub shaft 170, which lies along the transverse axis 172, has an integral pair of spools 222 and 223 coaxially mounted thereon and journaled for rotation about the stub shaft 170. The spools 222 and 223 are located between the boss 174 of the rotatable housing 173 and the side rail 160, which places the spool 223 in alignment with the second spool 221 of the transfer spool assembly 220. A cable 224 interconnects and is suitably affixed to the aligned spools 223 and 221 so that rotation of the transfer spool assembly 220 produces rotary movement of the integral pair of spools 222 and 223 about the stub shaft 170.

A cable 225 is wound around the spool 222, of the integral pair of spools 222 and 223, and extends therefrom into wound and fixed engagement with another spool 226, which is affixed such as by welding, to an indicator means in the form of an index wheel 227. The spool 226 and the index wheel 227 are suitably journaled for rotation about the fixed shaft 184.

The periphery of the index wheel 227 has a suitable scale 228 thereon which is graduated in circular degree increments. A magnifying lense 229, which may be provided with a vernier scale as will hereinafter be described, is positioned so as to overlay the scale 228 of the index wheel 227.

The lense 229 is mounted on a support arm 230 which is integral with and extends from a sleeve 231 which is concentrically carried on the fixed shaft 184 and held fast therewith by means of a set screw 232.

It will now be seen that movement of the swivel housing 212 about the swivel axis 208 will be transmitted, as described above, to produce rotary movement of the index wheel 227 so that the swivel housing can be precisely located at any desired point about the swivel axis 208.

A cable locking device 234 is carried on the side rail 160 for cinchingly locking the cable 225 so that when the swivel housing 212 has been placed in a desired position, it can be locked in that position. The cable locking device 234 is identical to the previously described cable locking device 190 and reference is made thereto for the operational description and structural details of the device 234.

As shown in FIG. 15, the swivel housing 212 has a level 236 affixed thereto so that leveling of the entire secondary structural beam locating means 38 may be accomplished. Such leveling is needed for solving problems which require that reference to ground be made for location of the secondary structural member.

As the name implies, the purpose of the secondary structural member locating means 38, is to locate the secondary member, which in this instance is a beam, and this purpose is accomplished by employing that means to precisely locate the longitudinal axis 240, which is a simulation of, for example, the longitudinal axis 18 of the secondary beam 17 shown in FIG. 1a. Such location of the longitudinal axis 240 is seen to be accomplished by appropriate settings of the rotatable frame 129, carriage 142 and axis positioning means 159 which cooperate to establish the precise location of one end of the longitudinal axis 240, and appropriate settings of the rotatable housing 173 and swivel housing 212 are employed to set the attitude of the longitudinal axis 240.

As shown best in FIGS. 15 and 17, the longitudinal axis 240 extends longitudinally of the swivel housing 212, and is perpendicular with respect to the swivel axis 208.

A rotary coupler 241 is affixed to the extending end of the swivel housing 212 and is concentric with the longitudinal axis 240. The rotary coupler 241 includes a fixed disc 242 which is connected such as with screws 243 (FIG. 17) to the transverse interconnecting member 216 of the swivel housing 212. The member 216 is provided with a cavity 244 in which the enlarged head 245 of a stud 246 is positioned. The stud 246 extends from the cavity 244 and loosely passes through a central aperture 247 formed in the fixed disc 242 and is fixedly attached within a bore 248 of a rotatable disc 249 such as with a roll pin 250. The rotatable disc 249, which has a projecting mounting boss 251 fast therewith, is thus carried on the stud 246, and is rotatable about the longitudinal axis 240.

The periphery of the rotatable disc 249 is provided with a circular scale 252 which is graduated in degree increments. A magnifying lense 253, which may be provided with a vernier scale as will hereinafter be described, is mounted on a bracket 254 that is fast with the fixed disc 242 and is configured so that the lense 253 will overlay the scale 252 of the rotatable disc 249.

A U-shaped clamp 255 is positioned so as to straddle the fixed and rotatable discs 242 and 249, respectively, and the clamp has one of its arms fast with the fixed disc 242 with its other arm adjacent the planar surface of the rotatable disc 249. The clamp 255 has a thumb screw 256, threadingly carried in the arm thereof which is adjacent the rotatable disc 249, with the thumb screw 256 being movable into engagement with the disc 249 to lock it in a desired position of rotation about the longitudinal axis 240.

It should now be apparent that the secondary structural member locating means 38 is capable of being manipulated so as to locate the longitudinal axis 240 in any desired orientation. Further, by employing the previously described rotary coupler 241, the mounting stud 251 thereof can be rotated about the longitudinal axis 240. The purpose for such rotation will be best understood by referring once again to FIG. 1a, wherein a secondary structural beam 17 having its longitudinal axis 18 is shown. Rotation of the rotary coupler 241 is similar to the act of rotating the beam 17 about its longitudinal axis 18.

Referring now to FIG. 19, wherein the magnifying lense 253 and a fragmentary portion of its mounting bracket 254 are shown. It will be understood that the following description will be typical of all of the magnifying lense structures of the apparatus of the present invention. The bracket 254 is provided with a suitably shaped aperture 258 formed therethrough into which a lense 259 and the magnifying lense 253 are placed and retained such as with a suitable adhesive. The lense 259 is provided with a vernier scale 260 etched or otherwise marked thereon, which, as is well known, is a type of scale employed for precision locating and/or measuring purposes. The magnifying lense 253 and the vernier lense 259 are preferrably bonded together by any suitable well known technique.

As seen best in FIG. 1, the secondary structural member locating means 38 is positioned so that the longitudinal axis 240 located thereby will pass through the open planar frame 36 which simulates the surface 14 of the primary beam 11 (FIG. 1a) as hereinbefore described. It should be noted that although the longitudinal axis 240 will extend at various attitudes, it must always pass through the frame 36, and such is made to occur by appropriate positioning of the secondary structural member locating means 38.

An extender beam 262 is demountably attached to the mounting boss 251 of the rotary coupler 241 so as to lie along the longitudinal axis 240. The extender beam 262 forms a part of and is adapted to slidably carry the secondary structural beam simulating means 40 thereon, with that means being best seen in FIGS. 20, 21 and 22.

The secondary beam simulating means 40 includes a sleeve 263 which is coaxially and slidably mounted on the extender beam 262 and has a thumb screw 264 threadingly carried therein for locking the sleeve 263 in the desired position. A pair of oppositely extending tubular arms 265 and 266 are affixed to opposite sides of the sleeve 263 so as to extend normally of the longitudinal axis 240. A pair of essentially identical transverse beam assemblies 267 and 268 are each mounted on a different one of the tubular arms 265 and 266 and are slidably positionable along the lengths of their respective ones of those arms 265 and 266.

Since the transverse beam assemblies 267 and 268 are essentially identical, the following detailed description of the assembly 268 will be understood to also apply to the assembly 267.

The transverse beam assembly 268 includes a sleeve 270 which is coaxially and slidably movable along the length of the tubular arm 266, and is lockable at various positions thereon by a thumb screw 271 threadingly carried in the sleeve. The sleeve 270 has a magnifying lense 272 mounted in one surface thereof, and that lense may be provided with a vernier scale as hereinbefore described. The lense 272 overlays a suitable linear scale 273 which is provided on the tubular arm 266, with the lense and scale being employed for precision locating of the beam assembly 268 with respect to the longitudinal axis 240.

A tubular rail 275 is affixed intermediate its opposite ends, such as by welding, to the opposite surface of the sleeve 270, with the oppositely extending portions of the tubular rail 275 each having a different one of a pair of carriages 276 and 277 coaxially and slidably mounted thereon. The opposite ends of the tubular rail 275 each have a tab 278 mounted thereon with a screw 279 extending therebetween. The screw 279 is parallel with respect to the tubular rail 275 and it is journaled for rotation in the tabs 278 and in a center support member 280 carried by the tubular rail 275. The right hand portion, as viewed in FIG. 22, of the screw 279 is provided with a right hand screw thread 281 formed thereon which is in threaded engagement with an internally threaded bore 282 formed through the carriage 277. The left hand portion of the screw 279 has a left hand screw thread 283 formed thereon and that screw thread 283 is in threaded engagement with an internally threaded bore 284 formed through the carriage 276. Thus, rotation of the screw 279, which is provided such as by manipulation of a hand knob 285 provided on the end thereof, will slidingly move the carriages along their respective portions of the tubular rail 275, with the sliding movement occurring simultaneously and resulting in movement of the carriages 276 and 277 either toward or away from each other depending on the direction of rotation imparted to the screw 279.

The carriage 276 has a magnifying lense 287, which may be provided with a vernier scale as hereinbefore described, with the lense 287 being disposed to overlay a suitable linear scale 288 provided on the tubular rail 275. The lense 287 and the scale 288 are cooperatively employed for precisely locating the carriages 276 and 277 at desired, and equal, distances from the tubular arm 266. The carriage 276 is also provided with a threaded thumb screw 289 which is employed to lock the carriages in the desired position.

It should be noted that the lense 287 and the scale 288 of the transverse beam assembly 268 has an identical counterpart in the transverse beam assembly 267, thus, the exact locations of the carriages 276 and 277 of the beam assembly 268 can be duplicated, or precisely deviated from, in the equivalent carriages 276 and 277 of the beam assembly 267.

As hereinbefore mentioned, the secondary beam simulating means 40 will serve as the imaginary plane 27 of the actual beam 17 as shown in FIG. 1a, with the tubular arms 265 and 266 along with the transverse beam assemblies 267 and 268 serving as the imaginary plane 27.

A further function of the secondary beam simulating means 40 is for simulating the precise locations where the longitudinally extending corner edges 23, 24, 25 and 26 of the secondary beam 17 intersect the imaginary plane 27, with this function being accomplished by appropriately adjusting the transverse beam assemblies 267 and 268, and the carriages 276 and 277 relative to the longitudinal axis 240.

With the peripheral configuration of the secondary beam 17, as it appears on the imaginary plane 27, being established as described above, the precise orientation of the cut ends 19, 20, 21, and 22 of the secondary beam 17 is determined by measuring the length of each of the longitudinally extending corner edges 23, 24, 25, and 26 between their intersecting points on their imaginary plane 27 and where they meet the surface 14 of the primary beam. This latter function is simulatingly accomplished in the apparatus 10 of the present invention by the pattern determining means 41, the preferred form of which is best seen in FIGS. 20, 21, 22, and 23.

The preferred form of the pattern determining means 41 includes four rods 290 each of which is slidably connected such as by suitable clips 291 to a different one of the carriages 276 and 277 of the secondary structural beam simulating means 40. Each of the rods 290 is connected to its respective one of the carriages 276 and 277 so as to be parallel with respect to the longitudinal axis 240, and each of those rods represents a different one of the longitudinally extending corner edges 23, 24, 25, and 26 of the secondary beam. The pattern determining means 41 further includes a pair of movable bars 293 of magnetic material which are demountably attached to the planar surface of the open frame 36, with one of those bars 293 being shown in FIG. 21, and both being shown in FIG. 1. The open planar frame 36 is provided with strips of magnetic tape 294 on each of the elongated beams 106 and 107, and each of the transverse beams 108, 109, 110, and 111 thereof. The magnetic tape allows the movable bars 293 to be appropriately positioned on the frame 36 so that the rods 290 will engage the bars 293 regardless of the attitude of the secondary structural beam simulating means 40.

Figure 24:
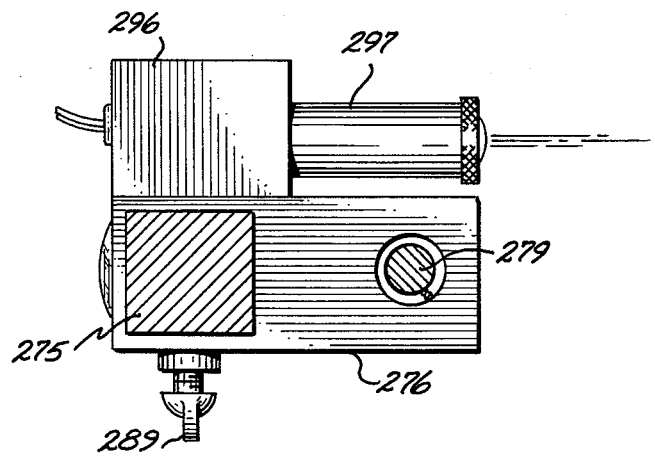
FIG. 24 illustrates a side view of a device which could be employed in the apparatus of the present invention in place of the device shown in FIG. 23.

A modification of the pattern determining means 41 is shown in FIG. 24 wherein one of the carriages, 276 for example, is shown as having a suitable electrically operated light source 296 with a focusing lense assembly 297 mounted thereon. In this embodiment, four such units, each including the light source 296 and the lense 297, are employed to project a light beam onto the movable bars 293, and thus simulate the locations of the cut edges 19, 20, 21, and 22 of the secondary beam 17.

Reference is now made to FIG. 25 wherein a second embodiment of the apparatus of the present invention is shown, with this apparatus being indicated generally by the reference numeral 300. This apparatus 300 is employed to simulate the intersection of structural elements such as conduits, pipes, and other elements of substantially circular or oval cross section.

For a clear understanding of the type of problems solved by this apparatus 300, reference is now made to FIG. 25a wherein a typical example of such a problem is diagramatically illustrated.

FIG. 25a illustrates a primary conduit 311 having its longitudinal axis 312 lying along a horizontal plane 313, and a secondary conduit 314 being disposed in an attitude so that its longitudinal axis 315 angularly approaches the primary conduit 311 from above the plane 313 in quadrant II.

The problem solved by the apparatus 300 is to determine the configuration of an irregular aperture 316 to be cut in the peripheral surface of the primary conduit 311 and to determine the configuration of the irregular end 317 to be cut in the secondary conduit 314, so that when those conduits are brought into intersecting engagement with each other, the end 317 will match the aperture 316 thus enabling the formation of a tight fitting joint therebetween.

As fragmentarily shown in FIG. 25, the apparatus 300 includes the stand means 30, which supportingly carries the yoke assembly 32, which in turn carries the box shaped housing 34 with the housing 34 supporting the open frame 36 and the secondary member locating means 38. The structural details and operations of all of these mechanisms have been hereinbefore fully described. However, since rotation of the primary conduit 311 about its longitudinal axis 312 will not alter the orientation of the surface which is presented to an intersecting secondary conduit 314, all intersecting problems involving conduits can be resolved with the primary conduit 311 lying in the horizontal plane. In other words, all calculations and layouts involved in the planning of intersecting conduits involve relationships of those conduits with respect to each other, and the relationships with respect to ground do not enter into the problem. Thus, many of the functions, as hereinbefore described, of the stand 30, yoke 32, housing 34 and open frame are not used in the apparatus 300.

The apparatus 300 employs the open frame 36 as a means for carrying a primary conduit simulating means 320 so that it is disposed in a plane which simulates the plane 313 of FIG. 25a. As shown in FIGS. 25, 26 and 27, the primary conduit simulating means 320 includes an identical pair of spaced curvature determining means 321 and 322 which are interconnected by a plurality of demountable spanners 323.

Since the pair of curvature determining means 321 and 322 are identical, the following description of the means 321 will be understood to also apply to means 322.

The curvature determining means 321 includes a pair of juxtapositionally disposed plates 325 between which a plurality of radially extending arms 326 are mounted. The arms 326 are carried on pivot pins 327, which also interconnect the plates 325, with the pivot pins 327 allowing the radial arms 326 to move from their extended position, as seen best in FIG. 26, to a collapsed position (not shown) in which all of the radial arms are pivoted into an upstanding position for convenience in handling and storage. When in the extended position, a pair of the radial arms 326 will be diametrically opposed and the others will be positioned in substantially equal radial increments therebetween, and such positioning will be maintained by suitable chains 328 which interconnect the arms. The radial arms 326 are all of the same length so that when the curvature determining means 321 is in the extended position, the extending ends of the arms will locate a plurality of points which lie along a semicircular curve, with that curve simulating the peripheral curvature of the primary conduit 311 of FIG. 25a.

Each of the diametrically opposed pair of arms 326 may be provided with a strip of magnetic tape 329 on the downwardly facing surfaces thereof so that the curvature determining means 321 can be firmly attached to the movable bars 293 which, as previously described, are carried on the open frame 36. In some instances, such as when the curvature determining means 321 and 322 are employed to simulate a relatively large conduit, the use of the magnetic tape strips 329 will not be needed as the pair of diametrically opposed arms 326 will be magnetically attracted to the existing magnetic tape 294 carried on the frame 36.

As previously mentioned, the curvature determining means 321 and 322 are interconnected by a plurality of demountable spanners 323 which are positioned to interconnect the extending ends of aligned ones of the radial arms 326. Such interconnection is accomplished by providing each of the spanners 323 with suitable clips 330 which snap into detents 331 formed on the extending ends of the radial arms 326.

A special bifurcated adapter 333 is shown as being mounted on the upstanding one of the arms 326 of the curvature determining means 321, and an identical bifurcated adapter 334 is similarly and aligningly mounted on the curvature determining means 322. The bifurcated adapters 333 and 334 are demountable so that they along with their pair of interconnecting spanners 323, may be mounted on the extending ends of any aligned pair of the radial arms 326 of the curvature determining means 321 and 322. The purpose for the bifurcated adapters 333 and 334, and the reasons for which relocation may be needed, will hereinafter be described in detail.

As seen in FIG. 26, a special pair of spanners 335 are employed to interconnect the diametrically opposed pair of radial arms 326 of curvature determining means 321 with the diametrically opposed pair of radial arms 326 of the curvature means 322. Each of those special spanners 335 are provided with a suitable clip 336 so that the opposite ends of a skin 337 may be attached thereto in a manner so that the skin will assume the semicircular curvature determined by the curvature determining means 321 and 322. The skin 337 may be formed of any suitable material which will assume and hold the arcuate configuration such as relatively heavy construction paper, one or two ply cardboard, or the like.

It should now be apparent that the primary conduit simulating means 320, as shown and described above, is adapted to simulate a conduit of a specific size, i.e., a conduit having a certain circumference. Therefore, in order to provide the apparatus 300 with versatility, a number of variously sized primary conduit simulating means (not shown) will be needed, with each having the capability of simulating a different size of conduit. Since conduits as customarily used are available in several standard sizes, a primary conduit simulating means, (not shown) will be needed for each of those standard conduit sizes.

Alternatively, a single primary conduit simulating means, such as the one described above, could be employed to simulate all standard sizes of conduit by simply using suitably telescoping radial arms (not shown) in place of the fixed length radial arms 326 of the curvature determining means 321 and 322.

Referring once again to FIG. 25, wherein the secondary member locating means 38 is shown to be located below the open frame 36 so that the longitudinal axis 240 located thereby will extend upwardly at various attitudes and pass through the open frame 36 and will also pass through the primary conduit simulating means 320. In this instance, the longitudinal axis 240 located by the secondary member locating means 38 will simulate the longitudinal axis 315 of the secondary conduit 314 of FIG. 25a.

Since the longitudinal axis 240 will pass through the primary conduit simulating means 320, the extender beam 262 carried by the rotary coupler 241 will have to pass through the skin 337 of the primary conduit simulating means 320 at some point thereon as determined by the secondary member locating means 38. Such passage may be accomplished by simply cutting the skin 337 away in the appropriate area after that area has been located by properly setting the secondary member locating means 38.

In some instances, the extender beam 262 will, by necessity, have to pass through a location which would normally be blocked by one of the spanners 323 of the primary conduit simulating means 320. In such a case, the passage blocking spanner 323 will have to be replaced by moving the previously described bifurcated adapters 333 and 334, along with the spaced pair of interconnecting spanners 323 thereof, to that location.

The apparatus 300 includes a secondary conduit simulating means 340 which is slidably and coaxially carried on the extender beam 262. As seen in FIGS. 28, 29, 30 and 31, the secondary conduit simulating means 340 is provided with a sleeve 341 which is clampingly affixed in the desired location on the extender beam 262 such as by thumb screw 342. The sleeve 341 carries a first disc 343 and a second disc 344, with those discs being fast with the sleeve, spaced from each other and transverse with respect to the longitudinal dimension of the sleeve 341 and thus also transverse with respect to the extender beam 262. The first disc 343 carries a rotating assembly 345 on the periphery thereof and the second disc 344 carries an inverted but identical rotating assembly 346 on its periphery.

Since the rotating assemblies 345 and 346 are identical, the following description of the rotating assembly 345 will be understood to also apply to the rotating assembly 346.

The rotating assembly 345 includes a pair of substantially square plates 347 and 348 which are positioned adjacent opposite planar surfaces of the disc 343. Each of the square plates 347 and 348 are formed with a circular bore 349 which is smaller in diameter than the disc 343, and a circular counter bore 350 which is larger than the diameter of the disc 343 so that when the plates are fixed to each other such as with bolts 351, the facing aligned counterbores 350 of the plates form an annulus in which a plurality of ball bearings 352 are located. Since the disc 343 is fast with the split sleeve 341, it will be seen that the rotating assembly 345 is the rotatable element and such rotation is about the longitudinal axis 240 established by the secondary member locating means 38.

The plates 348 of the rotating assemblies 345 and 346 each have a lip 354 formed along one of the edges thereof with those lips, in conjunction with the aligned edges of the plates 347, forming a pair of facing channels 355 for carrying the opposite edges of a slide plate 356 therebetween. The slide plate 356 is slidably movable in the facing channels 355 of the rotating assemblies 345 and 346, and may be locked in the desired position such as by a thumb screw 357 threadingly carried in the lip 354 of the plate 348 of the rotating assembly 345.

Since the slide plate 356 is carried on the rotating assemblies 345 and 346 as described above, it will be seen that the slide plate 356 will cause the assemblies to rotate in unison about the longitudinal axis 240 and the slide plate will be rotatably movable with those rotating assemblies. Further, the slide plate 356 is bent at a right angle to provide means for supporting a pattern determining means 360, as will hereinafter be described, which is also rotatable about the longitudinal axis 240.

The secondary conduit simulating means 340 also includes a cylindrical boss 362 which coaxially extends from the disc 344 and is affixed thereto such as by welding, with the cylindrical boss being adapted to demountably carry a cylindrical drum 364 thereon. The drum 364 comprises a circular coupling plate 365 which has a collar 366 extending coaxially therefrom with the collar 366 having a larger diameter than the cylindrical boss 362 so that the collar may be mounted in circumscribing engagement over the boss. The cylindrical drum 364 also includes a support plate 367 which is spaced from the coupling plate 365, with those plates 365 and 367 being interconnected with a replaceable skin 368. As with the previously described skin 337, the skin 368 may be formed of any suitable material which will assume the cylindrical configuration as dictated by the plates 365 and 367, and such material can be relatively heavy paper or relatively thin gauge cardboard. In any event, the skin 368 may be formed into the desired cylindrical shape and held in that configuration by having its opposite ends suitably interconnected such as by masking tape 369.

It may now be seen that the cylindrical drum 364 will simulate a secondary conduit, such as the conduit 314 shown in FIG. 25a by duplicating the peripheral configuration and circumference dimension thereof. Thus, since the drum 364 is of a fixed circumference, it will be necessary to provide a plurality of such drums with each being configured to simulate a different standard size conduit.

The pattern determining means 360 is coupled to the slide plate 356 by a flanged channel 370 which is mounted on the plate by thumb screws 371. The pattern determining means 360 includes a follower arm 372 of square cross sectional tubular configuration. The follower arm 372 is slidably movable in the flanged channel 370, with the channel holding the arm in substantially parallel relationship with respect to the longitudinal axis 240.

The follower arm 372 carries a first scribing means 374 at one end thereof, and a second scribing means 375 at its opposite end.

The first scribing means 374, as seen best in FIGS. 32 and 33, includes a pair of spaced plates 376 which are disposed for sliding engagement with opposite sides of the arm 372 and are both affixed, such as by welding, to a socket 377. The plates 376 carry the socket 377 in a transverse relationship with respect to the longitudinal dimension of the arm 372 with the socket extending through a pair of aligned slots 378 each of which is formed through a different one of the opposite sides of the follower arm. The plates 376 and 377 also carry a suitable thumb screw 379 and nut 380 which when tightened will pull the plates into clamped engagement with the arm 372 to provide means for locked positioning of the first scribing means 374.

The socket 377 is provided with a bore 381 in which a spring 382 is positioned, with the spring providing biasing means for a suitable scribe 383 which is positioned for axial sliding movement in the bore 381 of the socket 377. The scribe 383 extends from an open end 384 of the socket 377 and has a pointed end 385 which is biasingly held in engagement with the skin 368 of the cylindrical drum 364 as best seen in FIG. 28.

The follower arm 372 is formed with an inwardly offset portion 386 which is bifurcated on its extending end to provide a spaced pair of parallel tongues 387. The second scribing means 375 includes a socket 388 which is positioned between the tongues 387 and is carried on a pivot pin 389 which is transversely mounted to extend between the tongues. The socket 388 has a bore 390 formed therein in which a spring 391 and scribe 392 are mounted so that the scribe 392 is biased to protrude from an open end 393 of the socket 388. The scribe 392 has a pointed end 394 which is biasingly held in engagement with the skin 337 of the primary conduit simulating means 320, as seen best in FIGS. 25 and 28.

A transverse plate 395 is mounted, such as by welding, to extend between the tongues 387 and that plate carries a thumb screw 396 which bears against the socket 388 so that the second scribing means 375 can be held in variously pivoted positions about the pivot pin 389. The pivoted positioning of the second scribing means 375 is employed for precise alignment of the pointed end 394 of the scribe 392 with the periphery of the cylindrical drum 364 as shown in FIG. 28.

With the secondary conduit simulating means 340 and the pattern determining means 360 configured and operable as described above, it will be seen that when the follower arm 372 of the pattern determining means 360 is rotated about the longitudinal axis 240, the first scribing means 374 will scribe an irregular or undulating pattern about the cylindrical drum 364. This irregular pattern results from the second scribing means 375 bearing against the following the contour of the skin 337 of the primary conduit simulating means 320, with this contour following movement producing an appropriate reciprocating sliding movement of the follower arm 372 in the channel 370. The irregular pattern thus scribed on the skin 368 of the cylindrical drum 364 will be the equivalent of the irregular end cut 317 of the secondary conduit 314 as shown in the example of FIG. 25a. It will also be seen that the contour following action of the second scribing means 375 is held in a precise path which is dictated by the bearing contact of the first scribing means 374 as it is rotated about the periphery of the drum 364. Thus, the second scribing means 375 in addition to its contour following function will simultaneously scribe a pattern on the skin 337 of the primary conduit simulating means 320, and that pattern will be the equivalent of the irregular cut aperture 316 of the primary conduit 311 as shown in the example of FIG. 25a.

Once the above described patterns have been scribed, the skin 368 of the drum 364 may be removed and employed as a pattern for cutting the irregular end of the secondary conduit, such as the end 317 of the conduit 314 shown in the example of FIG. 25a. Likewise, the skin 337 of the primary conduit simulating means 320 may be removed and used as a pattern for cutting of, for example, the irregular aperture 316 of the primary conduit 311.

It should now be apparent that apparatus 10 and apparatus 300 are basically the same mechanisms with the apparatus 10 being equipped to handle problems relating to intersecting beams and the apparatus 300 being equipped to handle problems relating to intersecting conduits. It should also be apparent that the secondary conduit simulating means 340 could be installed on the apparatus 10 in place of the secondary beam simulating means 40 and the resulting apparatus (not shown) would then be equipped to handle problems relating to a secondary conduit intersecting with a primary beam. Further, the secondary conduit simulating means 340 of apparatus 300 could be replaced with the secondary beam simulating means 40 with the resulting apparatus (not shown) being capable of handling problems relating to the intersection of a secondary beam with a primary conduit.

As hereinbefore described, the apparatus 300 is intended to operate with the open frame 36 in the horizontal plane for handling problems relating to intersecting conduits, and it may also handle some problems of intersecting beams providing that the primary beam has 0° slope and is not rotated about its longitudinal axis. Therefore, since the open frame 36 is not moved in the handling of such problems, it should be obvious that a simplified embodiment of the apparatus of the present invention will suffice in such instance. An example of such a simplified embodiment is shown in FIGS. 36, 37, 38 and 39 with the apparatus shown therein being indicated generally by the reference numeral 400.

The apparatus 400 includes an especially constructed table 401 having its upper surface in the form of an open rectangular frame 402 which comprises a spaced pair of parallel side rails 403 which are interconnected at their opposite ends by transverse end rails 404, the upwardly facing surfaces of the end and side rails 403 and 404 have strips of magnetic tape 405 suitable affixed thereon. Thus, it will be seen that the open frame 402 of the apparatus 400 serves the same purpose as the previously described open frame 36 in that either the movable bars 293 or the primary conduit simulating means 320 can be placed thereon to solve the intersection problems which this apparatus 400 is capable of handling.

The special table 401 also includes a spaced pair of parallel tracks 406 which are disposed below the open frame 402 and the tracks are parallel with respect to the frame 402.

A secondary structural element locating means 408 is slidably carried on the tracks 406 of the table 401, with that means 408 being adapted to accomplish the same purpose as the previously described secondary structural element locating means 38.

The secondary structural element locating means 408 includes a carriage structure having a base plate 410 having suitable grooves 411 formed in the lower surface thereof for sliding engagement with the tracks 406. The plate 410 has a plurality of hook bolts 412 (two shown) which engage the lower surfaces of the tracks 406 to prevent tipping of the secondary structural element locating means 408 and which may also be employed for locking purposes.

The slidable base plate 410 has a cylindrical standard, or post, 413 extending normally from the upper surface thereof, with the post being affixed thereto such as by welding. An axis positioning means including a cylindrical drum 414 is carried on the upper end of the post 413 and is suitably journaled, such as with bushing 415, for rotation about the longitudinal carriage axis 416 established by the post.

A clamp means 417, as shown in FIG. 39, is connected by brackets 418 to the bottom of the drum 414, with those brackets carrying a rotatable shaft 419, with the shaft having threads 420 formed on one end thereof and a knurled knob 421 on the other end. The shaft 419 is in threaded engagement with a clamp 422 which is positioned to circumscribe the post 413. Rotation of the shaft 419 in one direction will loosen the clamp 422 so that it can be freely rotated about the post 413 which, of course, allows the cylindrical drum 414 to rotate about the post also. Rotation of the shaft 419 in the opposite direction will tighten the clamp 422 and cause it to cinchingly engage the periphery of the post 413. Therefore, the clamp means 417 provides means for locking the drum 414 in variously rotated positions about the longitudinal carriage axis 416 of the post.

As shown in FIG. 36, a suitable scale 424 is provided on the upper plate 425 of the drum 414, with that scale being coaxial with the axis 416 and thus coaxial with the drum 414. A magnifying lens 426, which may be provided with a suitable vernier scale as previously described, is positioned to overlay the scale 424, and is held in that position by a bracket 427 carried on the slidable base plate 410. The scale 424, lens 426, and the clamp means 417 allow the drum 414 to be accurately positioned and locked in any desired rotated position about the longitudinal carriage axis 416 of the post 413.

A shaft 430 having a longitudinal axis 431 is journaled for rotation in suitable pillow blocks 432 which are mounted on the upper plate 425 of the drum 414. The shaft 430 is positioned so that its axis 431 is transverse with respect to the carriage axis 416 of the post 413.

An elongated mounting block 433 having a longitudinal axis 434 is coupled to the shaft 430 for rotation therewith and is located along the length of the shaft so as to be positioned centrally of the plate 425 of the drum 414. Rotation of the drum 414, as previously described, will cause the mounting block 433 to rotate about is own longitudinal axis 434 in a path indicated by the arrow 435 in FIG. 36. Rotation of the shaft 430 will cause the mounting block 433 to rotate about the axis 431 of the shaft so that the block 433, and its axis 434, can be swung in an arc indicated by the arrow 436 in FIG. 36.

It may now be seen that the longitudinal axis 434 of the mounting block 433 is the equivalent of the longitudinal axis 240 of the hereinbefore described secondary structural element locating means 38, and is employed for precisely locating the attitude of the secondary structural beam simulating means or the secondary structural conduit simulating means which may be coupled to the block 433 as will hereinafter be described.

A cable spool 438 is mounted fast on the end of the shaft 430 for rotation therewith, and the spool 438 is positioned to extend beyond the periphery of the drum 414. A cable 439 is connected to the cable spool 438 and extends downwardly therefrom into wound around engagement with a second cable spool 440. The cable spool 440 is carried on a stub shaft 441 which is journaled for rotation in a suitable inner bushing 442 carried in a cross brace 443 provided internally of the drum 414, and in an outer bushing 444 carried in a tunnel housing 445. The tunnel housing is affixed to the side of the drum 414 and serves to cover the cable 439. An index wheel 446 is mounted fast on the extending end of the stub shaft 441 for rotation therewith, and the index wheel is provided with a suitable scale 447 on the periphery thereof, with the scale being divided into circular degree increments.

A magnifying lens 448, which may be provided with a vernier scale as previously described, is carried by a bracket 449 mounted on the tunnel housing 445, and is positioned to overlay the scale 447 of the index wheel 446. The index wheel 446 mounted and connected as described above provides means for accurate rotational positioning of the mounting block 433 about the axis 431 of the shaft 430.

A cable lock device 450, FIG. 38, is mounted on the tunnel housing 445 and is adapted to lockably engage the cable 439 and thereby prevent rotation of the mounting block 433 and the index wheel 446. The cable lock device 450 is identical to the previously described cable lock device 190 (FIG. 18) and therefore its structure and operation will not need to be repeated.

As shown, the mounting block 433 is provided with a rectangular in cross section bore 451 axially formed therein for connection of a rotary coupler 452 to the mounting block. The rotary coupler 452 has a fixed disc 453 which has a rectangular mounting boss 454 axially extending therefrom for demountable insertion into the bore 451 of the mounting block 433. A rotatable disc 456 is coaxially and rotatably coupled to the fixed disc 453 with the rotatable disc 456 having an axially extending socket 457.

With the exception of the mounting boss 454 and the socket 457, the rotary coupler 452 is identical to the previously described rotary coupler 241, and thus, the details of construction and operation of the rotary coupler 452 need not be repeated.

An extender beam 460 is demountably inserted into the socket 457 of the rotary coupler 452 so as to lie along the longitudinal axis 434 of the mounting block 433. The extender beam 460 is adapted to slidably carry the previously described secondary structural beam simulating means 40 (FIG. 1) or the secondary structural conduit simulating means 340 (FIG. 25) in the same manner and for the same purposes as previously described. The extender beam 460 instead of having either of the above mentioned simulating means mounted thereon, may be provided with a suitable T-coupler 462 slidably movable, and lockable, along the length thereof. The T-coupler is adapted to demountably retain a transverse extender beam 464 which is employed to slidably carry the above mentioned simulating means, either means 40 or means 340, so that those devices may be properly positioned for tangential intersection with the primary conduit simulating means 320 (FIG. 25) when that latter means is positioned on the open frame 402 of the apparatus 400.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An apparatus for simulating the intersecting attitudes of an elongated primary member and an elongated secondary member for determining the configuration of those members at the intersection thereof, said apparatus comprising:
   (a) primary member simulating means for simulating the attitude and at least a portion of the surface of the elongated primary member, said primary member simulating means including,
      I. a frame of substantially open planar configuration,
      II. means for supporting said planar frame in a horizontal plane, and
      III. means supportingly positioned on said open planar frame for forming an arcuate surface of predetermined curvature with that arcuate surface simulating at least a portion of the surface of the elongated primary member when the primary member to be simulated is of a substantially circular cross sectional configuration,
   (b) secondary member locating means mounted on said primary member simulating means for simulating the location and the attitude of the longitudinal axis of the elongated secondary member to be simulated;
   (c) secondary member simulating means coupled to said secondary member locating means for simulating at least a portion of the surface of the elongated secondary member; and
   (d) pattern determining means mounted on said secondary member simulating means and in contact with the surface simulated thereby, said pattern determining means extending from said secondary member simulating means into contact with the surface simulated by said primary member simulating means for simulating the configurations of the simulated elongated primary and the simulated elongated secondary members at the intersection thereof.

2. An apparatus as claimed in claim 1 wherein said secondary member locating means comprises:
   (a) a carriage attached to said primary member simulating means and movable relative thereto in a plane which is juxtaposed with respect to the surface simulatable by said primary member simulating means; and
   (b) an axis positioning means mounted in said carriage and movable relative thereto for simulatingly establishing the position of one end of the longitudinal axis of the secondary member simulatable by said secondary member simulating means and for establishing the attitude of that longitudinal axis.

3. An apparatus as claimed in claim 1 wherein said secondary member locating means comprises:
   (a) a frame of endless configuration mounted on said primary member simulating means and rotatable in a plane juxtaposed with respect to the surface of the primary member simulatable by said primary member simulating means;
   (b) a carriage mounted in said frame and slidably movable linearly thereacross, said carriage defining a carriage axis which lies in the rotational plane of said frame and is transverse to the direction of sliding movement of said carriage;
   (c) an axis positioning means carried in said carriage so as to be rotatable about the carriage axis and to be slidable in a direction transverse to the carriage axis for simulatingly establishing the position of one end of the longitudinal axis of the secondary member simulatable by said secondary member simulating means; and
   (d) said axis positioning means including a rotatable member and a swivel member which are adjustable for setting the attitude of the longitudinal axis of the secondary member simulatable by said secondary member simulating means.

4. An apparatus as claimed in claim 3 wherein said axis positioning means comprises:
   (a) a spaced pair of interconnected parallel side rails;
   (b) said rotatable member mounted between an aligned pair of the ends of said side rails and journaled for rotation about an axis which is transversely disposed with respect to said pair of side rails;
   (c) a fixed shaft extending transversely between said pair of side rails;
   (d) a first index wheel rotatably journaled on said fixed shaft and having a scale thereon;
   (e) means interconnecting said rotatable member and said first index wheel for producing equal and simultaneous rotation of said first index wheel upon rotation of said rotatable member;
   (f) indicator means mounted on said fixed shaft and aligned with the scale of said first index wheel for indicating the rotational positioning of said rotatable member;
   (g) said swivel member mounted on said rotatable member for rotation about an axis which is transverse to the rotational axis of said rotatable member;
   (h) a second index wheel rotatably journaled on said fixed shaft and having a scale thereon;
   (i) means interconnecting said swivel member and said second index wheel for producing equal and simultaneous rotation of said second index wheel upon rotation of said swivel members; and
   (j) indicator means mounted on said fixed shaft and aligned with the scale of said second index wheel for indicating the rotational positioning of said swivel member.

5. An apparatus as claimed in claim 4 wherein each of said indicator means comprises:
   (a) a magnifying lens aligned with the scale of its respective one of said first and said second index wheels; and
   (b) a vernier scale positioned beneath said magnifying lens.

6. An apparatus as claimed in claim 1 wherein said secondary member locating means comprises:
   (a) a carriage attached to said primary member simulating means and linearly movable relative thereto in a path juxtaposed and coextending with respect to the surface of the primary member simulatable by said primary member simulating means; and
   (b) an axis positioning means mounted on said carriage and adjustably movable thereon for simulatingly establishing the position of one end of the longitudinal axis of the secondary member simulatable by said secondary member simulating means and for establishing the attitude of that longitudinal axis.

7. An apparatus as claimed in claim 1 wherein said secondary member locating means comprises:
   (a) a carriage defining a carriage axis, said carriage mounted on said primary member simulating means and linearly movable in a path parallel and coextending with respect to the surface of the primary member simulatable by said primary member simulating means and having the carriage axis thereof disposed perpendicular with respect to that surface;

(b) a drum rotatably mounted on said carriage for rotation about the carriage axis thereof;

(c) a shaft on said drum for rotation therewith in a plane transverse to the carriage axis of said carriage, said shaft journaled for rotation about its longitudinal axis; and (d) a mounting block having a longitudinal axis which is employed to simulate the longitudinal axis of the secondary member simulatable by said secondary member simulating means, said mounting block fixed to said shaft for rotation therewith and disposed thereon to rotate with said drum about the carriage axis of said carriage.

8. An apparatus as claimed in claim 7 wherein said secondary member locating means further comprises an indicator means located on said carriage and on said drum for indicating the rotational positioning of said drum about the carriage axis.

9. An apparatus as claimed in claim 7 wherein said secondary member locating means further comprises an indicator means mounted on said drum and connected to said shaft for indicating the rotational positioning of said mounting block about the axis of said shaft.

10. An apparatus as claimed in claim 1 wherein said secondary member simulating means comprises:

(a) an extender beam coupled to said secondary member locating means and lying along the longitudinal axis simulated thereby; and (b) means slidably mounted on said extender beam for defining a plane transverse to said extender beam and for adjustably locating a plurality of points in that transverse plane with those points simulating a plurality of locations lying on the surface of the elongated secondary member to be simulated.

11. An apparatus as claimed in claim 1 wherein said secondary member simulating means comprises:

(a) an extender beam coupled to said secondary member locating means and lying along the longitudinal axis simulated thereby;

(b) a pair of arms slidably carried on said extender beam, said arms in alignment with each other and extending normally and oppositely from said extender beam;

(c) a pair of transverse beams each mounted intermediate its opposite ends to a different one of said pair of arms to divide said beams into substantially equal oppositely extending segments;

(d) said pair of arms and said pair of transverse beams cooperating to define a plane which is transverse to said extender beam;

(f) four carriages each mounted on a different segment of said pair of transverse beams; and (f) said pair of transverse beams slidably movable along the length of their respective ones of said pair of arms, and said carriage slidably movable along their respective segments of said pair of transverse beams whereby said carriages may be located at various points within the transverse plane defined by said arms and said beams with those points being employed to simulate locations lying on the surface of the secondary member to be simulated.

12. An apparatus as claimed in claim 11 wherein said secondary member simulating means further comprises indicator means on said pair of arms and on said pair of transverse beams for indicating the slidable positioning of said pair of beams along said pair of arms.

13. An apparatus as claimed in claim 11 wherein said secondary member simulating means further comprises indicator means on each of said pair of transverse beams and on at least one of said carriages for indicating the slidable positioning of said carriages along their respective segments of said transverse beams.

14. An apparatus as claimed in claim 11 wherein said carriages have means thereon for coupling said pattern determining means thereto.

15. An apparatus as claimed in claim 11 wherein said carriages have said pattern determining means mounted thereon, said pattern determining means comprising:

(a) four elongated rods each connected to a different one of said carriages and extending therefrom parallel with respect to the longitudinal axis simulated by said secondary member locating means; and (b) each of said elongated rods slidable movable with respect to said carriages for movement into contact with the surface simulated by said primary member simulating means.

16. An apparatus as claimed in claim 11 wherein said carriages have said pattern determining means mounted thereon, said pattern determining means comprising:

(a) four electrically operated light sources each mounted on a different one of said carriages, each of said light sources having a focusing lens mounted thereon for projecting four beams of light from said light sources with those beams parallel with respect to the longitudinal axis simulated by said secondary member locating means; and (b) each of the beams of light from said light sources projectable onto the surface simulated by said primary member simulating means.

17. An apparatus as claimed in claim 1 wherein said secondary member simulating means comprises:

(a) an extender beam coupled to said secondary member locating means and lying along the longitudinal axis simulated thereby; and (b) a drum of predetermined circumference demountably coaxially mounted on said extender beam.

18. An apparatus as claimed in claim 17 wherein said drum comprises:

(a) a coupling plate of predetermined circumference;

(b) a support plate spaced from and parallel with respect to said coupling plate and having a circumference substantially equal to the circumference of said coupling plate; and (c) a skin demountably extending between said coupling plate and said support plate, said skin conformable to assume a cylindrical configuration having a circumference substantially equal to the circumferences of said coupling plate and said support plate.

19. An apparatus as claimed in claim 1 wherein said secondary member simulating means comprises:

(a) an extender beam coupled to said secondary member locating means and lying along the longitudinal axis simulated thereby;

(b) at least one fixed disc slidably carried on said extender beam in a plane transverse thereto;

(c) a drum of predetermined circumference demountably carried on said fixed disc coaxial with respect to said extender beam, said drum simulating the surface of the secondary member to be simulated; and (d) means connected to said fixed disc for coupling said pattern determining means thereto.

20. An apparatus as claimed in claim 19 wherein said means comprises:
   (a) a rotating assembly journaled for rotation about the periphery of said fixed disc;
   (b) a slide plate carried on said rotating assembly for rotation therewith, said slide plate tangentially slidable relative to said fixed disc; and
   (c) channel means mounted on said slide plate for coupling said pattern determining means thereon, said pattern determining means slidable in said channel means in a path parallel to the longitudinal axis of said extender beam.

21. An apparatus as claimed in claim 20 wherein said pattern determining means comprises:
   (a) an elongated follower arm mounted in said channel means for rotation with said rotating assembly and for free sliding movement in the path parallel to said extender beam;
   (b) a first scribing means mounted on one end of said follower arm for engagement with the periphery of said drum;
   (c) a second scribing means mounted on the other end of said follower arm for engagement with the surface simulated by said primary member simulating means;
   (d) said first scribing means scribing a pattern about the periphery of said drum upon rotation of said rotating assembly with the configuration of that pattern being determined by the contour of said drum and the contour of the surface simulated by said primary member simulating means; and
   (e) said second scribing means scribing a pattern on the surface simulated by said primary member simulating means upon rotation of said rotating assembly with the configuration of that pattern being determined by the contour of said drum and the contour of the surface simulated by said primary member simulating means.

22. An apparatus as claimed in claim 1 wherein said means for forming an arcuate surface comprises:
   (a) a spaced pair of curvature determining means each locating a plurality of points along an arc of predetermined curvature;
   (b) a plurality of spanners demountably interconnecting said pair of curvature determining means, each of said spanners extending between an aligned pair of the points located by said pair of curvature determining means; and
   (c) a skin demountably carried atop said plurality of spanners, said skin conformable to assume the arcuate curvature determined by said pair of curvature determining means.

23. An apparatus as claimed in claim 22 wherein each of said pair of curvature determining means comprises:
   (a) a pair of juxtaposed plates;
   (b) a plurality of arms positioned between said plates and extending radially therefrom;
   (c) a plurality of pins for interconnecting said pair of plates and for pivotably coupling said plurality of arms therebetween; and
   (d) means interconnecting said plurality of arms for holdingly spacing those arms in radial increments.

24. An apparatus for simulating the intersecting attitudes of an elongated primary member and an elongated secondary member for determining the configuration of those members at the intersection thereof, said apparatus comprising:
   (a) primary member simulating means for simulating the attitude and at least a portion of the surface of the elongated primary member, said primary member simulating means including,
      I. a frame of substantially open planar configuration for simulating a surface of the elongated primary member, and
      II. means for adjustably supporting said open frame in various attitudes;
   (b) secondary member locating means mounted on said primary member simulating means for simulating the location and the attitude of the longitudinal axis of the elongated secondary member to be simulated;
   (c) secondary member simulating means coupled to said secondary member locating means for simulating at least a portion of the surface of the elongated secondary member; and
   (d) pattern determining means mounted on said secondary member simulating means and in contact with the surface simulated thereby, said pattern determining means extending from said secondary member simulating means into contact with the surface simulated by said primary member simulating means for simulating the configurations of the simulated elongated primary and the simulated elongated secondary members at the intersection thereof.

25. An apparatus as claimed in claim 1 wherein said means for adjustably supporting said open frame comprises:
   (a) an upstanding standard defining a vertical axis;
   (b) a housing mounted on the upper end of said standard and defining a horizontal axis;
   (c) a yoke coupled to said housing for rotation about the horizontal axis defined thereby, said yoke having a pair of parallel arms;
   (d) a box shaped housing mounted between the arms of said yoke and rotatable about an axis which is transverse with respect to the horizontal axis about which said yoke is rotatable, said box shaped housing including at least one planar plate transversely disposed between the arms of said yoke with that plate having an endless circular track formed therein; and
   (e) said frame of substantially open planar configuration being positioned in juxtaposed relationship with respect to the plate of said box shaped housing, said frame having a plurality of spaced wheel assemblies which are engaged with the track of said box shaped housing and movable therein so that said frame is attached to said box shaped housing and is rotatable in a plane parallel with respect to the plate of said box shaped housing.

26. An apparatus as claimed in claim 3 wherein said standard is a telescoping mechanism.

27. An apparatus as claimed in claim 3 wherein said housing is rotatably mounted on the upper end of said standard for rotation about the vertical axis defined thereby.

28. An apparatus as claimed in claim 3 wherein said primary member simulating means further comprises an indicating means on said housing and on said yoke for indicating the rotated position of said yoke about the horizontal axis defined by said housing.

29. An apparatus as claimed in claim 3 wherein said primary member simulating means further comprises an indicating means on the plate of said box shaped housing and on said planar frame for indicating the rotated position of said frame relative to said box shaped housing.

30. An apparatus as claimed in claim 24 wherein said secondary member locating means comprises:
   (a) a carriage attached to said primary member simulating means and movable relative thereto in a plane which is juxtaposed with respect to the surface simulatable by said primary member simulating means; and
   (b) an axis positioning means mounted in said carriage and movable relative thereto for simulatingly establishing the position of one end of the longitudinal axis of the secondary member simulatable by said secondary member simulating means and for establishing the attitude of that longitudinal axis.

31. An apparatus as claimed in claim 24 wherein said secondary member locating means comprises:
   (a) a frame of endless configuration mounted on said primary member simulating means and rotatable in a plane parallel to the surface of the primary member simulatable by said primary member simulating means;
   (b) a carriage mounted in said frame and slidably movable linearly thereacross, said carriage defining a carriage axis which lies in the rotational plane of said frame and is transverse to the direction of sliding movement of said carriage;
   (c) an axis positioning means carried in said carriage so as to be rotatable about the carriage axis and to be slidable in a direction transverse to the carriage axis for simulatingly establishing the position of one end of the longitudinal axis of the secondary member simulatable by said secondary member simulating means; and
   (d) said axis positioning means including a rotatable member and a swivel member which are adjustable for setting the attitude of the longitudinal axis of the secondary member simulatable by said secondary member simulating means.

32. An apparatus as claimed in claim 31 wherein said secondary member locating means further comprises a rotary coupler connected to said axis positioning means so as to lie along the longitudinal axis simulated thereby, said rotary coupler adjustable for setting the axial rotational orientation of the secondary member simulatable by said secondary member simulating means.

33. An apparatus as claimed in claim 31 wherein said axis positioning means comprises:
   (a) a spaced pair of interconnected parallel side rails;
   (b) said rotatable member mounted between an aligned pair of the ends of said side rails and journaled for rotation about an axis which is transversely disposed with respect to said pair of side rails;
   (c) a fixed shaft extending transversely between said pair of side rails;
   (d) a first index wheel rotatably journaled on said fixed shaft and having a scale thereon;
   (e) means interconnecting said rotatable member and said first index wheel for producing equal and simultaneous rotation of said first index wheel upon rotation of said rotatable member;
   (f) indicator means mounted on said fixed shaft and aligned with the scale of said first index wheel for indicating the rotational positioning of said rotatable member;
   (g) said swivel member mounted on said rotatable member for rotation about an axis which is transverse to the rotational axis of said rotatable member;
   (h) a second index wheel rotatably journaled on said fixed shaft and having a scale thereon;
   (i) means interconnecting said swivel member and said second index wheel for producing equal and simultaneous rotation of said second index wheel upon rotation of said swivel member; and
   (j) indicator means mounted on said fixed shaft and aligned with the scale of said second index wheel for indicating the rotational positioning of said swivel member.

34. An apparatus as claimed in claim 33 wherein each of said indicator means comprises:
   (a) a magnifying lens aligned with the scale of its respective one of said first and said second index wheels; and
   (b) a vernier scale positioned beneath said magnifying lens.

35. An apparatus as claimed in claim 24 wherein said secondary member locating means comprises:
   (a) a carriage attached to said primary member simulating means and linearly movable relative thereto in a path parallel and coextending with respect to the surface of the primary member simulatable by said primary member simulating means; and
   (c) an axis positioning means mounted on said carriage and adjustably movable thereon for simulatingly establishing the position of one end of the longitudinal axis of the secondary member simulatable by said secondary member simulating means and for establishing the attitude of that longitudinal axis.

36. An apparatus as claimed in claim 24 wherein said secondary member locating means comprises:
   (a) a carriage defining a carriage axis, said carriage mounted on said primary member simulating means and linearly movable in a path parallel and coextending with respect to the surface of the primary member simulatable by said primary member simulating means and having the carriage axis thereof disposed perpendicular with respect to that surface;
   (b) a drum rotatably mounted on said carriage for rotation about the carriage axis thereof;
   (c) a shaft on said drum for rotation therewith in a plane transverse to the carriage axis of said carriage, said shaft journaled for rotation about its longitudinal axis; and
   (d) a mounting block having a longitudinal axis which is employed to simulate the longitudinal axis of the secondary member simulatable by said secondary member simulating means, said mounting block fixed to said shaft for rotation therewith and disposed thereon to rotate with said drum about the carriage axis of said carriage.

37. An apparatus as claimed in claim 36 wherein said secondary member locating means further comprises an indicator means located on said carriage and on said drum for indicating the rotational positioning of said drum about the carriage axis.

38. An apparatus as claimed in claim 36 wherein said secondary member locating means further comprises an indicator means mounted on said drum and connected to said shaft for indicating the rotational positioning of said mounting block about the axis of said shaft.

39. An apparatus as claimed in claim 24 wherein said secondary member simulating means comprises:
   (a) an extender beam coupled to said secondary member locating means and lying along the longitudinal axis simulated thereby; and
   (b) means slidably mounted on said extender beam for defining a plane transverse to said extender beam and for adjustably locating a plurality of points in that transverse plane with those points simulating a plurality of locations lying on the surface of the elongated secondary member to be simulated.

40. An apparatus as claimed in claim 24 wherein said secondary member simulating means comprises:
   (a) an extender beam coupled to said secondary member locating means and lying along the longitudinal axis simulated thereby;
   (b) a pair of arms slidably carried on said extender beam, said arms in alignment with each other and extending normally and oppositely from said extender beam;
   (c) a pair of transverse beams each mounted intermediate its opposite ends to a different one of said pair of arms to divide said beams into substantially equal oppositely extending segments;
   (d) said pair of arms and said pair of transverse beams cooperating to define a plane which is transverse to said extender beam;
   (e) four carriages each mounted on a different segment of said pair of transverse beams; and
   (f) said pair of transverse beams slidably movable along the length of their respective ones of said pair of arms, and said carriage slidably movable along their respective segments of said pair of transverse beams whereby said carriages may be located at various points within the transverse plane defined by said arms and said beams with those points being employed to simulate locations lying on the surface of the secondary member to be simulated.

41. An apparatus as claimed in claim 40 wherein said secondary member simulating means further comprises indicator means on said pair of arms and on said pair of transverse beams for indicating the slidable positioning of said pair of beams along said pair of arms.

42. An apparatus as claimed in claim 40 wherein said secondary member simulating means further comprises indicator means on each of said pair of transverse beams and on at least one of said carriages for indicating the slidable positioning of said carriages along their respective segments of said transverse beams.

43. An apparatus as claimed in claim 40 wherein said carriages have means thereon for coupling said pattern determining means thereto.

44. An apparatus as claimed in claim 40 wherein said carriages have said pattern determining means mounted thereon, said pattern determining means comprising:
   (a) four elongated rods each connected to a different one of said carriages and extending therefrom parallel with respect to the longitudinal axis simulated by said secondary member locating means;
   (b) at least a pair of movable bars demountably and movably attached to the surface simulated by said primary member simulating means; and
   (c) each of said elongated rods slidably movable with respect to said carriages for movement into contact with said movable bars so that the points located by said carriages are projected onto the surface simulated by said primary member simulating means.

45. An apparatus as claimed in claim 40 wherein said carriages have said pattern determining means mounted thereon, said pattern determining means comprising:
   (a) four electrically operated light sources each mounted on a different one of said carriages, each of said light sources having a focusing lens mounted thereon for projecting four beams of light from said light sources with those beams parallel with respect to the longitudinal axis simulated by said secondary member locating means;
   (b) at least a pair of movable bars demountably and movably attached to the surface simulated by said primary member simulating means; and
   (c) each of the beams of light from said light sources projectable onto said movable bars so that the points located by said carriages are projected onto the surface simulated by said primary member simulating means.

46. An apparatus as claimed in claim 24 wherein said secondary member simulating means comprises:
   (a) an extender beam coupled to said secondary member locating means and lying along the longitudinal axis simulated thereby; and
   (b) a drum of predetermined circumference demountably coaxially mounted on said extender beam.

47. An apparatus as claimed in claim 46 wherein said drum comprises:
   (a) a coupling plate of predetermined circumference;
   (b) a support plate spaced from and parallel with respect to said coupling plate and having a circumference substantially equal to the circumference of said coupling plate; and
   (c) a skin demountably extending between said coupling plate and said support plate, said skin conformable to assume a cylindrical configuration having a circumference substantially equal to the circumferences of said coupling plate and said support plate.

48. An apparatus as claimed in claim 24 wherein said secondary member simulating means comprises:
   (a) an extender beam coupled to said secondary member locating means and lying along the longitudinal axis simulated thereby;
   (b) at least one fixed disc slidably carried on said extender beam in a plane transverse thereto;
   (c) a drum of predetermined circumference demountably carried on said fixed disc coaxial with respect to said extender beam, said drum simulating the surface of the secondary member to be simulated; and
   (d) means connected to said fixed disc for coupling said pattern determining means thereto.

49. An apparatus as claimed in claim 48 wherein said means comprises:
   (a) a rotating assembly journaled for rotation about the periphery of said fixed disc;
   (b) a slide plate carried on said rotating assembly for rotation therewith, said slide plate tangentially slidable relative to said fixed disc; and
   (c) channel means mounted on said slide plate for coupling said pattern determining means thereon, said pattern determining means slidable in said channel means in a path parallel to the longitudinal axis of said extender beam.

50. An apparatus as claimed in claim 49 wherein said pattern determining means comprises:

(a) an elongated follower arm mounted in said channel means for rotation with said rotating assembly and for free sliding movement in the path parallel to said extender beam;
(b) a first scribing means mounted on one end of said follower arm for engagement with the periphery of said drum;
(c) a second scribing means mounted on the other end of said follower arm for engagement with the surface simulated by said primary member simulating means;
(d) said first scribing means scribing a pattern about the periphery of said drum upon rotation of said rotating assembly with the configuration of that pattern being determined by the contour of said drum and the contour of the surface simulated by said primary member simulating means; and
(e) said second scribing means scribing a pattern on the surface simulated by said primary member simulating means upon rotation of said rotating assembly with the configuration of that pattern being determined by the contour of said drum and the contour of the surface simulated by said primary member simulating means.

* * * * *